US012113362B2

(12) United States Patent
Lumanog

(10) Patent No.: US 12,113,362 B2
(45) Date of Patent: Oct. 8, 2024

(54) FAULT-RESPONSIVE POWER SYSTEM AND METHOD USING ACTIVE LINE CURRENT BALANCING

(71) Applicant: EQUINOX POWER INNOVATIONS INC., Vancouver (CA)

(72) Inventor: Glenn Lumanog, Surrey (CA)

(73) Assignee: Equinox Power Innovations Inc., Vancouver (CA)

( * ) Notice: Subject to any disclaimer, the term of this patent is extended or adjusted under 35 U.S.C. 154(b) by 393 days.

(21) Appl. No.: 17/698,710

(22) Filed: Mar. 18, 2022

(65) Prior Publication Data
US 2023/0299583 A1    Sep. 21, 2023

(51) Int. Cl.
| H02J 3/14 | (2006.01) |
| H02J 3/00 | (2006.01) |
| H02J 3/18 | (2006.01) |

(52) U.S. Cl.
CPC .............. *H02J 3/144* (2020.01); *H02J 3/003* (2020.01); *H02J 3/1857* (2013.01)

(58) Field of Classification Search
CPC .......... H02J 3/144; H02J 3/003; H02J 3/1857; H02J 1/102; H02J 1/106
See application file for complete search history.

(56) References Cited

U.S. PATENT DOCUMENTS

| 6,177,783 B1 | 1/2001 | Donohue |
| 6,320,771 B1 | 11/2001 | Hemena et al. |
| 8,068,937 B2 | 11/2011 | Eaves |
| 9,112,422 B1 | 8/2015 | Vinciarelli |
| 9,184,795 B2 | 11/2015 | Eaves |
| 9,425,614 B2 | 8/2016 | Kiong et al. |

(Continued)

FOREIGN PATENT DOCUMENTS

| WO | WO/2022/187095 | 2/2022 |
| WO | WO/2022/187485 | 3/2022 |
| WO | WO/2022/177850 | 8/2022 |

OTHER PUBLICATIONS

V. J. Thottuvelil, G. Verghese, "Analysis and control design of paralleled DC/DC converters with current sharing", Webpage <https://www.semanticscholar.org/paper/Analysis-and-control-design-of-paralleled-DC%2FDC-Thottuvelil-Verghese/058f1dd43ed042090c93368e649049ddfd6c9576>, Feb. 23, 1997.

(Continued)

*Primary Examiner* — Mohammad Ali
*Assistant Examiner* — Dhruvkumar Patel

(57) ABSTRACT

A fault-responsive power system and method using active line current balancing. First and second supply-side currents flowing from at least one power supply and into first and second conductor pairs, respectively, are measured. First and second remote-side currents flowing from the first and second conductor pairs and into first and second power converters, respectively, are measured. The outputs of the first and second power converters are electrically coupled together in parallel and deliver power to a load. The first and second remote-side currents are balanced in response to measurements of the first and second remote-side currents while power is being delivered. When a difference between the first and second supply-side currents at least meets a magnitude threshold, the first and second supply-side currents are reduced until the difference is less than the magnitude threshold.

29 Claims, 17 Drawing Sheets

(56) References Cited

U.S. PATENT DOCUMENTS

| | | |
|---|---|---|
| 9,496,702 B2 | 11/2016 | Dong et al. |
| 9,906,303 B2 | 2/2018 | Michaelis et al. |
| 9,941,917 B2 | 4/2018 | Wang et al. |
| 10,257,056 B2 | 4/2019 | Jazani et al. |
| 10,261,560 B2 | 4/2019 | Hunter, Jr. et al. |
| 10,348,093 B2 | 7/2019 | Suryanarayana et al. |
| 10,396,844 B2 | 8/2019 | Coleman et al. |
| 10,470,120 B2 | 11/2019 | Fischer |
| 10,476,264 B2 | 11/2019 | Vijayan et al. |
| 10,658,837 B2 | 5/2020 | Azani |
| 10,712,515 B2 | 7/2020 | Chamberlain et al. |
| 10,735,105 B2 | 8/2020 | Goergen et al. |
| 10,742,131 B2 | 8/2020 | Wang et al. |
| 10,812,664 B2 | 10/2020 | Kostakis et al. |
| 10,816,601 B2 | 10/2020 | Yang et al. |
| 10,912,025 B2 | 2/2021 | Coleman et al. |
| 11,129,095 B2 | 9/2021 | Gandhi |
| 11,294,409 B2 | 4/2022 | Chamberlain et al. |
| 2012/0075759 A1 | 3/2012 | Eaves |
| 2016/0126855 A1* | 5/2016 | Gautam .............. H02J 1/10 363/65 |
| 2017/0141570 A1* | 5/2017 | Vijayan .............. H02M 3/28 |
| 2017/0317500 A1* | 11/2017 | Kumar .............. G01R 31/42 |
| 2021/0382102 A1* | 12/2021 | Siddique .............. H02H 3/445 |
| 2022/0360067 A1 | 11/2022 | Inada et al. |

OTHER PUBLICATIONS

Gallo, Ernie, "The Power of 5G", Web page <https://isemag.com/2021/06/telecom-2021-small-cells-5g-powering/>, Jun. 21, 2021.
International Search Report from the Canadian Intellectual Property Office acting as International Searching Authority for International Application Serial No. PCT/CA2023/050345, dated Jun. 16, 2023, 3 pages.

* cited by examiner

FAULT-RESPONSIVE POWER SYSTEM AND METHOD USING ACTIVE LINE CURRENT BALANCING

TECHNICAL FIELD

The present disclosure is directed at a fault-responsive power system and method using active line current balancing.

BACKGROUND

Generally speaking, power distribution systems can be put into either of two categories: those that rely on local powering, and those that rely on centralized power distribution.

For example, in an application such as powering remote RF radios in wireless telecom networks, local powering is implemented by installing power conversion devices that tap electricity directly from the electric utility grid, and that then convert the AC electricity to lower voltage DC electricity that is usable for the intended loads. The major drawbacks with this powering method are a relatively high cost of acquiring multiple power meters, a longer turn-around time to get the requisite permitting for site acquisition, and the fact that this method is not economically feasible and scalable for mass deployment because of the sheer volume of remote powered devices and equipment required.

Centralized power distribution is often preferred over local powering. A centralized powering solution, also known as adopting a "hub and spoke" topology in industry, leverages a single connection to the electric utility grid from which a centralized power hub derives power. The centralized power hub then distributes the power to multiple remotely located network devices that can be installed thousands of feet away from the centralized power source.

The industry typically implements centralized power distribution in either of two ways. The more common method is "Remote Feeding Telecommunications-Voltage limited" ("RFT-V"). An emerging and newer approach is referred to as "centralized bulk powering" or using a "Fault Managed Power System".

In traditional RFT-V line powering, multiple loads in different locations are supplied remotely from a single centralized power source using multiple conductor pairs in a one-to-one configuration; that is, one dedicated conductor pair or set of conductor pairs is used for each remote load. To facilitate efficient delivery of power over longer distances, the line voltage is usually boosted to +/−190 VDC or 380 VDC peak-to-peak. However, the total permitted power per circuit is limited to 100 W for safety reasons. In essence, the system is inherently safer due to relatively low power operation, but this also creates a serious disadvantage: because of that power constraint, RFT-V line powering is not cost effective for applications where the remote loads demand power consumption that exceeds that constraint. An example of such an application for which RFT-V is unsuitable is powering next-generation remote small cells for 5G cellular networking, which have a relatively high power requirement and are deployed in high volumes for network coverage densification. This is because as the demand of power increases, so does the total number of conductor pairs and power conversion devices. Other drawbacks for RFT-V line powering are the cable weight resulting from under-utilized conductor pairs and the fact that RFT-V infrastructure cannot be upgraded after initial installation without incurring a substantial capital expenditure.

In centralized bulk powering, instead of using power-limited circuits in which power is transmitted via multiple pairs of smaller wires, centralized bulk powering transmits an elevated voltage (e.g., any voltage between 300 to 450 VDC) over a single dedicated power conductor pair having a relatively larger diameter. Centralized bulk powering does not mandate a limit on the maximum power that can be transmitted over the conductors. This enables multiple remote loads that can be powered by just using a single conductor pair as opposed to multiple conductor pairs as in RFT-V. Consequently, the cost, weight, and the effective diameter of the conductors are significantly reduced, which is beneficial for both aerial and underground system installations. In addition, other advantages include the need for a lower number of power conversion devices, connectors, junction boxes, and surge protector fixtures.

SUMMARY

According to a first aspect, there is provided a system comprising: first and second power converters, wherein power outputs of the first and second power converters are electrically coupled together in parallel; first and second supply-side current sensors for measuring first and second supply-side currents flowing into first and second conductor pairs, respectively, from the at least one power supply; first and second remote-side current sensors for measuring first and second remote-side currents flowing into the first and second power converters from the first and second conductor pairs, respectively; a current balancing controller for communicating with the first and second power converters and the first and second remote-side current sensors, and configured to balance the first and second remote-side currents flowing into the first and second power converters in response to measurements from the first and second remote-side current sensors; at least one switch electrically coupled to the at least one power supply and operable to adjust magnitudes of the first and second supply-side currents; and a fault management controller for communicating with the at least one switch and the first and second supply-side current sensors, wherein the fault management controller is configured to: determine that a difference between the first and second supply-side currents at least meets a magnitude threshold; and reduce the first and second supply-side currents in response to the difference at least meeting the magnitude threshold until the difference is less than the magnitude threshold by using the at least one switch.

The fault management controller may be further configured to determine a duration for which the difference between the first and second supply-side currents at least meets the magnitude threshold, and the first and second currents may be reduced in response to the difference at least meeting the magnitude threshold and the duration at least meeting a duration threshold.

The at least one power supply may comprise a first power supply, and the first and second conductor pairs may both be powered by the first power supply.

The first conductor pair may comprise a first conductor and a common return line, and the second conductor pair may comprise a second conductor and the common return line.

The at least one power supply may comprise a first power supply and a second power supply, the first conductor pair may be powered by the first power supply, and the second conductor pair may be powered by the second power supply.

Each of the first and second power converters may comprise a DC-DC converter comprising primary switches operable to control an input impedance or gain of the DC-DC converter. The DC-DC converter may be configured to receive a drive signal based on a control signal from the current balancing controller and to adjust a switching frequency or the duty cycle of the primary switches in response to the drive signal.

Each of the first and second power converters may further comprise a feedback loop electrically coupled to an output of the DC-DC converter and configured to generate the drive signal based on a measurement of at least one of voltage and current at the power output of the power converter, and on the control signal.

Each of the first and second power converters may further comprise a fixed frequency or duty cycle pulse generator and be configured to generate the drive signal based on an output of the fixed frequency or duty cycle pulse generator and on the control signal.

The current balancing controller may comprise: a current averaging circuit electrically coupled to the first and second remote-side current sensors for determining an average remote-side current; first and second current summing circuits each electrically coupled to the current averaging circuit and respectively electrically coupled to the first and second remote-side current sensors for respectively determining first and second remote-side current errors between each of the first and second remote-side currents and the average remote-side current; and first and second compensation circuits respectively coupled to the first and second current summing circuits for generating the control signal that is sent to the first power converter and the control signal that is sent to the second power converter.

The fault management controller may comprise: current summing circuitry electrically coupled to the first and second supply-side current sensors and configured to generate a current signal representing a difference between the first and second supply-side currents; and current signal qualifying circuitry comprising a comparator configured to compare the current signal to the magnitude threshold and output a comparator output signal, wherein the fault management controller turns off the first and second supply-side currents based on the comparator output signal indicating that the current signal at least meets the magnitude threshold.

The fault management controller may be further configured to determine a duration for which the difference between the first and second supply-side currents at least meets the magnitude threshold. The first and second supply-side currents may be reduced in response to the difference at least meeting the magnitude threshold and the duration at least meeting a duration threshold, and the fault management controller may further comprise signal on-delay circuitry comprising an on-delay timer that is electrically coupled to the output of the comparator and that is configured to output a fault signal when the comparator output signal has indicated that the current signal at least meets the magnitude threshold for the duration threshold.

The system may further comprise timer delay period circuitry electrically coupled to the current summing circuitry and configured to determine the duration threshold as a value that varies in response to the difference between the first and second supply-side currents.

The timer delay period circuitry may be configured to determine the duration threshold from a lookup table indexed by different values of the difference between the first and second supply-side currents, or formulaically based on the difference between the first and second supply-side currents.

The at least one switch may comprise part of the at least one power supply, and the fault management controller may be configured to modulate the at least one switch to reduce the first and second supply-side currents to non-zero values.

The at least one switch may be opened to reduce the first and second supply-side currents to zero.

According to another aspect, there is provided a method comprising: measuring first and second supply-side currents flowing from at least one power supply and into first and second conductor pairs, respectively; measuring first and second remote-side currents flowing from the first and second conductor pairs and into first and second power converters, respectively, wherein power outputs of the first and second power converters are electrically coupled together in parallel; balancing the first and second remote-side currents in response to measurements of the first and second remote-side currents; determining that a difference between the first and second supply-side currents at least meets a magnitude threshold; and reducing the first and second supply-side currents in response to the difference at least meeting the magnitude threshold until the difference is less than the magnitude threshold.

The method may further comprise determining a duration for which the difference between the first and second supply-side currents at least meets the magnitude threshold, wherein the first and second supply-side currents are reduced in response to the difference at least meeting the magnitude threshold and the duration at least meeting a duration threshold.

The at least one power supply may comprise a first power supply, and the first and second conductor pairs may both be powered by the first power supply.

The first conductor pair may comprise a first conductor and a common return line, and the second conductor pair may comprise a second conductor and the common return line.

The at least one power supply may comprise a first power supply and a second power supply, the first conductor pair may be powered by the first power supply, and the second conductor pair may be powered by the second power supply.

Each of the first and second power converters may comprise a DC-DC converter comprising primary switches operable to control an input impedance or gain of the DC-DC converter, and the method may further comprise for each of the first and second power converters: receiving a control signal from a current balancing controller; and generating a drive signal based on the control signal, wherein actively balancing the first and second currents comprises adjusting a switching frequency or duty cycle of the primary switches in response to the drive signal.

The method may further comprise, for each of the first and second power converters: measuring at least one of voltage and current at a power output of the power converter; and generating the drive signal based on a measurement of at least one of voltage and current at a power output of the power converter and on the control signal.

The method may further comprise, for each of the first and second power converters, generating the drive signal based on an output of a fixed frequency or duty cycle pulse generator and on the control signal.

The method may further comprise, at the current balancing controller: determining an average remote-side current entering the first and second power converters from the first and second remote-side currents; determining first and second remote-side current errors between each of the first and second remote-side currents and the average remote-side current; and generating the control signal for the first power converter from the first remote-side current error and generating the control signal for the second power converter from the second remote-side current error.

The method may further comprise: determining a difference between the first and second supply-side currents; and determining the duration threshold as a value that varies in response to the difference between the first and second supply-side currents.

The duration threshold may be determined from a lookup table indexed by different values of the difference between the first and second supply-side currents, or formulaically based on the difference between the first and second supply-side currents.

Reducing the first and second supply-side currents may comprise modulating switches in the at least one power supply such that the first and second supply-side currents are reduced to non-zero values.

Reducing the first and second supply-side currents may comprise opening at least one switch to reduce the first and second supply-side currents to zero.

According to another aspect, there is provided a non-transitory computer readable medium having stored thereon computer program code that is executable by a processor and that, when executed by the processor, causes the processor to perform the method of any of the above aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
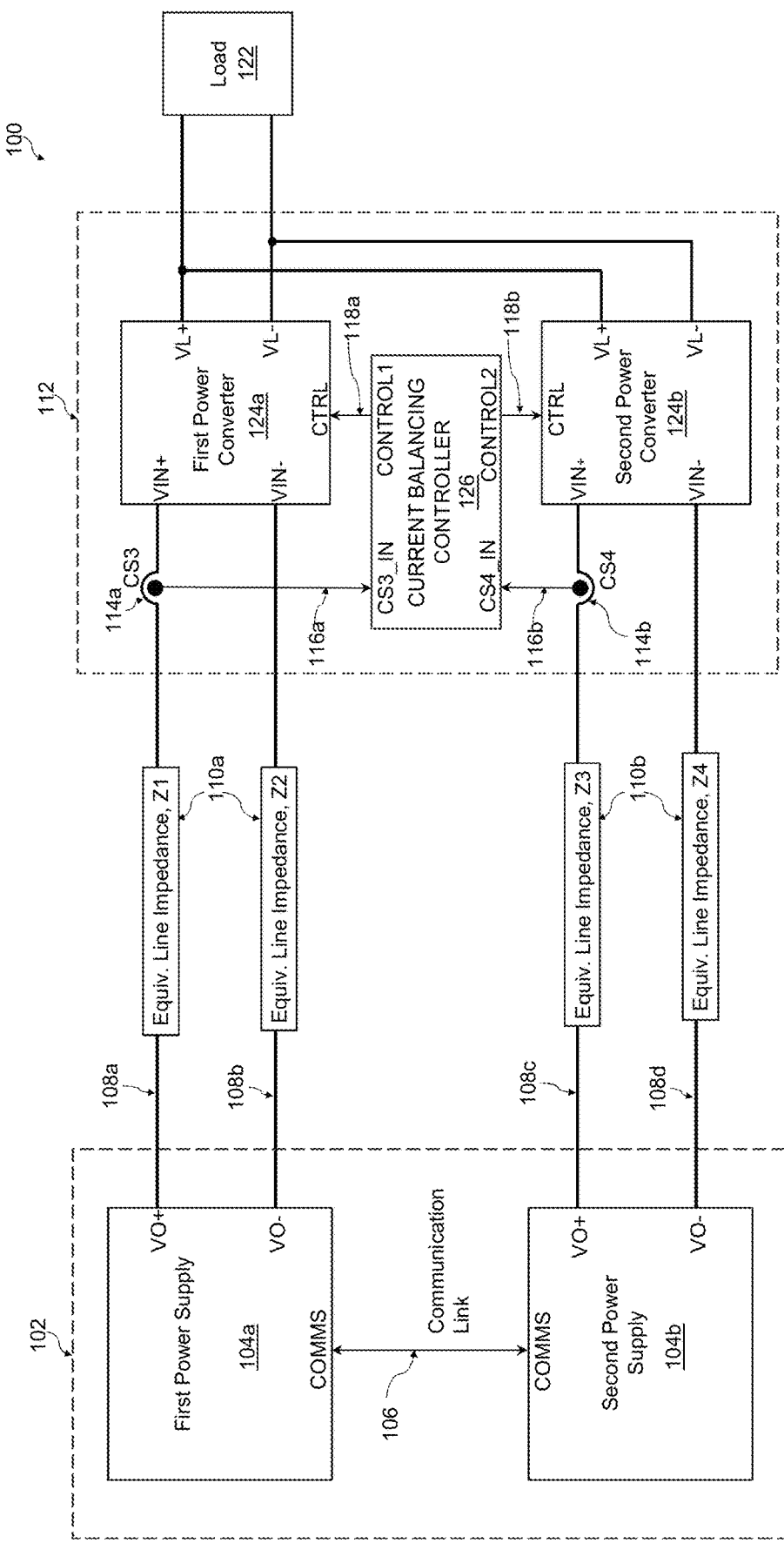
FIG. 1 is a block diagram of a fault-responsive power system using active line current balancing, according to an example embodiment.

Generally speaking, in a high voltage DC power transmission system that uses centralized bulk powering one or more power supplies transmits high voltage electricity to one or more DC-to-DC power converters. The one or more DC-to-DC power converters convert the inbound electric power to a lower voltage suitable for powering a load electrically coupled to an output of the one or more DC-to-DC power converters. One or more live conductors acting as power transmission lines electrically couple the one or more power supplies to the one or more DC-to-DC power converters. Typical transmission distances span 200 ft (~60 m) to 8 kft (~2,400 m), for example. The currents entering the transmission lines from the one or more power supplies are the "supply-side" currents, while the currents entering the one or more DC-to-DC power converters from the transmission lines are the "remote-side" currents.

However, transmitting high voltage DC power poses a safety risk in that a person who inadvertently causes an electrical fault, such as by touching two different live conductors, may receive a serious electrical shock. Ideally, the supply-side currents are equal to the remote-side currents. However, if a person has caused an electrical fault along the transmission lines, the supply-side and remote-side currents will differ as a result of a certain amount of current being conducted through the body of the person who caused the fault.

Various solutions to address the risk of electrical shock in high voltage DC power transmission systems have been proposed. For example, one solution uses supply-side and remote-side controllers to respectively independently monitor the supply-side and remote-side currents, and to communicate the remote-side current measurements from the remote-side controller to the supply-side controller. The supply-side controller compares the remote-side current measurement it receives to the supply-side current it measures. If the currents differ, the supply-side controller concludes a fault is present and can shut down power transmission. However, this solution requires a low-latency communication link to connect the two controllers, which can be practically problematic.

Another example solution also uses supply-side and remote-side controllers to respectively control a supply-side switch and a remote-side switch that, when both open, electrically isolate the transmission lines. Pulsed power is delivered into the transmission lines and when both switches are open and the transmission lines isolated, the supply-side controller monitors the voltage decay on the transmission lines. A decay rate that exceeds a predefined threshold indicates the presence of an electrical fault in response to which the supply-side controller can shut down power transmission. However, delivering pulsed power requires relatively large power conductors, which increases costs and is a relatively inefficient use of materials. Relying on monitoring voltage decay also makes this solution susceptible to parasitic capacitances and inductances.

Another example solution again uses supply-side and remote-side controllers to respectively control supply-side and remote-side switches. In normal operation, pulsed power is delivered from the supply-side to the remote-side by switching the remote-side switch on and off in synchronization with the signal coming from the supply-side controller. When the remote-side switch is off (i.e., no power is being delivered into the one or more power converters), the supply-side controller measures the magnitude of any supply-side current being delivered into the transmission lines. If this current exceeds a predefined threshold corresponding to an expected residual amount of current, the supply-side controller concludes that the current is due to an electrical fault and discontinues power transmission by opening the supply-side switch. However, this solution again requires a low-latency communications link between the controllers so that the supply-side controller knows when the remote-side switch is open, and pulsed power delivery requires a relatively large power conductor with the corresponding drawbacks as described above.

A fourth solution again uses a supply-side controller and, instead of a remote-side switch, a current slope limiter. The current slope limiter draws power from the one or more power supplies, with the supply-side controller monitoring the supply-side current and controlling a supply-side switch that can be used to shut power off. The current slope limiter is configured to draw current according to a pre-defined ramp function having the same slope regardless of input and load dynamics. If current is drawn in excess of this ramp function, the supply-side controller concludes the excess draw is due to an electrical fault and shuts off the supply-side switch. However, this solution requires high precision sensor devices and precise calibration, since it can be challenging to distinguish between the pre-defined ramp function and an electrical fault in real-world operating conditions; require a 2-stage power conversion on the remote-side, as a pre-regulator is used for the current slope limiter in addition to the one or more DC-DC converters themselves; and is transient event dependent in that the current slope is only detectable at the moment the fault happens, regardless of the duration of the fault. This raises the risk that the event or transition may be missed in real-world operating conditions, particularly in the presence of strong background noise.

In contrast to the above solutions, the systems and methods described herein are directed at using active line current balancing to perform fault detection. More particularly, one or more power supplies feed a load using two pairs of transmission lines. The transmission lines conduct power into DC power converters, the output of which are connected in parallel to feed a load. The currents entering the transmission lines from the one or more power supplies are "supply-side" currents, while the currents entering the DC power converters from transmission lines are the "converter-side" currents. Active current balancing is performed to cause the remote-side currents to be substantially identical regardless of load or line voltage variations. "Active current balancing" refers to employing closed-loop feedback control using the converter-side currents as the controlled parameter and then modifying the switching frequency or duty cycle of the DC power converters, thereby effectively changing the input impedance or power circuit gain to achieve balanced current. From the perspective of the one or more power supplies, absent an electrical fault they expect to see a "mirrored current" between the pairs of transmission lines. However, some kind of electrical fault such as an external line-to-line fault resulting from a person touching both live conductors on either pair of the transmission lines results in a current imbalance that can be detected on the supply-side. In response to such a current imbalance, power can be promptly reduced and, in some cases, shut off entirely. The systems and methods described herein accordingly do not require pulsed power, which helps to keep conductor size relatively small compared to alternative solutions that rely on pulsed power; do not require a communications link between supply-side and converter-side; and are less sensitive to parasitics and noise than some of the alternative solutions described above.

Figure 4B:
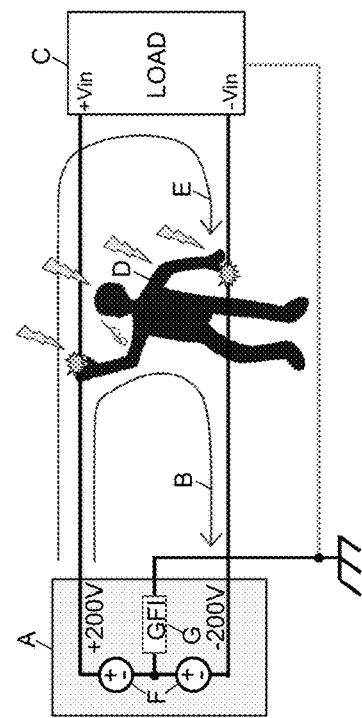
FIG. 4B depicts a flow of fault current for a scenario in which a person is touching two live conductors, according to the prior art.
Figure 4A:
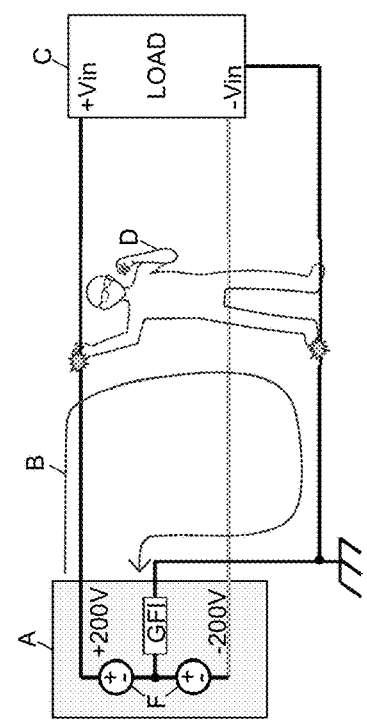
FIG. 4A depicts a flow of fault current for a scenario in which a person is touching a live conductor and ground, according to the prior art.

Referring first to FIGS. 4A and 4B, there are depicted in FIG. 4A a flow of fault current for a scenario in which a person is touching a live conductor and ground, and in FIG. 4B a flow of fault current for a scenario in which a person is touching two live conductors, both according to the prior art.

Each of FIGS. 4A and 4B depicts a power supply A that comprises a pair of voltage sources F electrically coupled in series. Each of the voltage sources F is 200 V, and the positive terminal of one of the voltage sources F is labeled at +200 V while the negative terminal of the other of the voltage sources F is labeled at −200 V. A ground fault interrupter ("GFI") G is electrically connected between the two sources F at 0 V to ground. An load C is electrically coupled to the +200 V and −200 V terminals of the power supply A and to ground.

In FIG. 4A, a person D commits a "line-to-ground fault" by touching their hand to the +200 V transmission line and their foot to ground. However, by virtue of the GFI G, body current B briefly flows from the +200 V terminal to the GFI G, which then detects and interrupts the current flow by turning off the voltage sources (control circuit not shown) and thereby prevents the person D from experiencing a serious electrical shock.

In contrast, in FIG. 4B the person D causes a line-to-line fault by touching the +200 V and −200 V transmission lines with their hands. This bypasses the GFI G, and consequently the line-to-line fault does not result in current interruption. The power supply A continues to supply a load current E even during the fault, and the body current B traveling through the person D can result in a serious electrical shock.

This problem is averted using, for example, an example embodiment of a fault-responsive power system 100 such as that depicted in the block diagram of FIG. 1. The system 100 generally comprises a power transmitter 102 electrically coupled to a power receiver 112 via a first conductor pair 110a and a second conductor pair 110b. More particularly, the power transmitter 102 comprises a first power supply 104a and a second power supply 104b that are communicatively coupled via a communication link 106. Each of the power supplies 104a,b comprises positive and negative terminals V0+ and V0−, with the positive and negative terminals of the first power supply 104a being respectively electrically coupled to first and second conductors 108a,b that comprise the first conductor pair 110a, and with the positive and negative terminals of the second power supply 104b being respectively electrically coupled to third and fourth conductors 108c,d that comprise the second conductor pair 110b. As shown in FIG. 1, the equivalent line impedances of the first through fourth conductors 108a-d are respectively Z1, Z2, Z3, and Z4.

The power receiver 112 comprises a first power converter 124a, a second power converter 124b, and a current balancing controller 126 that is used for active line current balancing. Power outputs labeled VL+ and VL− on each of the first and second power converters 124a,b are electrically connected together in parallel and used to power a load 122. The power receiver also comprises first and second remote-side current sensors 114a,b located along the first and third conductors 108a,c to measure currents flowing into the first and second power converters 124a,b from the first and second conductor pairs 110a,b ("remote-side currents"), respectively. As discussed in further detail below, the current balancing controller 126 receives first and second remote-side current signals 116a,b representative of the magnitudes of the currents flowing into the first and second power converters 124a,b, respectively; and from the first and second remote-side current signals 116a,b, the current balancing controller 126 determines first and second control signals 118a,b and sends them to the first and second power converters 124a,b, respectively. The first and second power converters 124a in response adjust their input impedances or power circuit gain accordingly to help ensure that the currents flowing into the first and second power converters 124a,b are substantially balanced (i.e., identical) within a certain tolerance threshold. The use of closed-loop feedback by the current balancing controller 126 in the form of the current signals 116a,b to control the power converters 124a,b and balance the remote-side currents is referred to as "active line current balancing".

As discussed in further detail below in respect of FIGS. 2, 3, and 5, the power transmitter measures a first supply-side current and a second supply-side current respectively flowing into the first and second conductor pairs 110a,b from the power transmitter 102. The communication link 106 is used to compare the first and second supply-side currents to each other. When the power transmitter 102 determines that a difference between the first and second supply-side currents at least meets the magnitude threshold, it concludes that the current imbalance is due to a fault since in normal operation the current balancing controller 126 keeps the remote-side currents (and consequently the supply-side currents) in balance. Consequently, the power transmitter reduces the first and second supply-side currents to less than the magnitude threshold and prevents a person who may have caused a fault from being seriously harmed. While not depicted in FIG. 1, either of the power supplies 104a,b may comprise an integrated fault management controller to control the first and second supply-side currents, as discussed for example in respect of FIG. 13 below.

Figure 2:
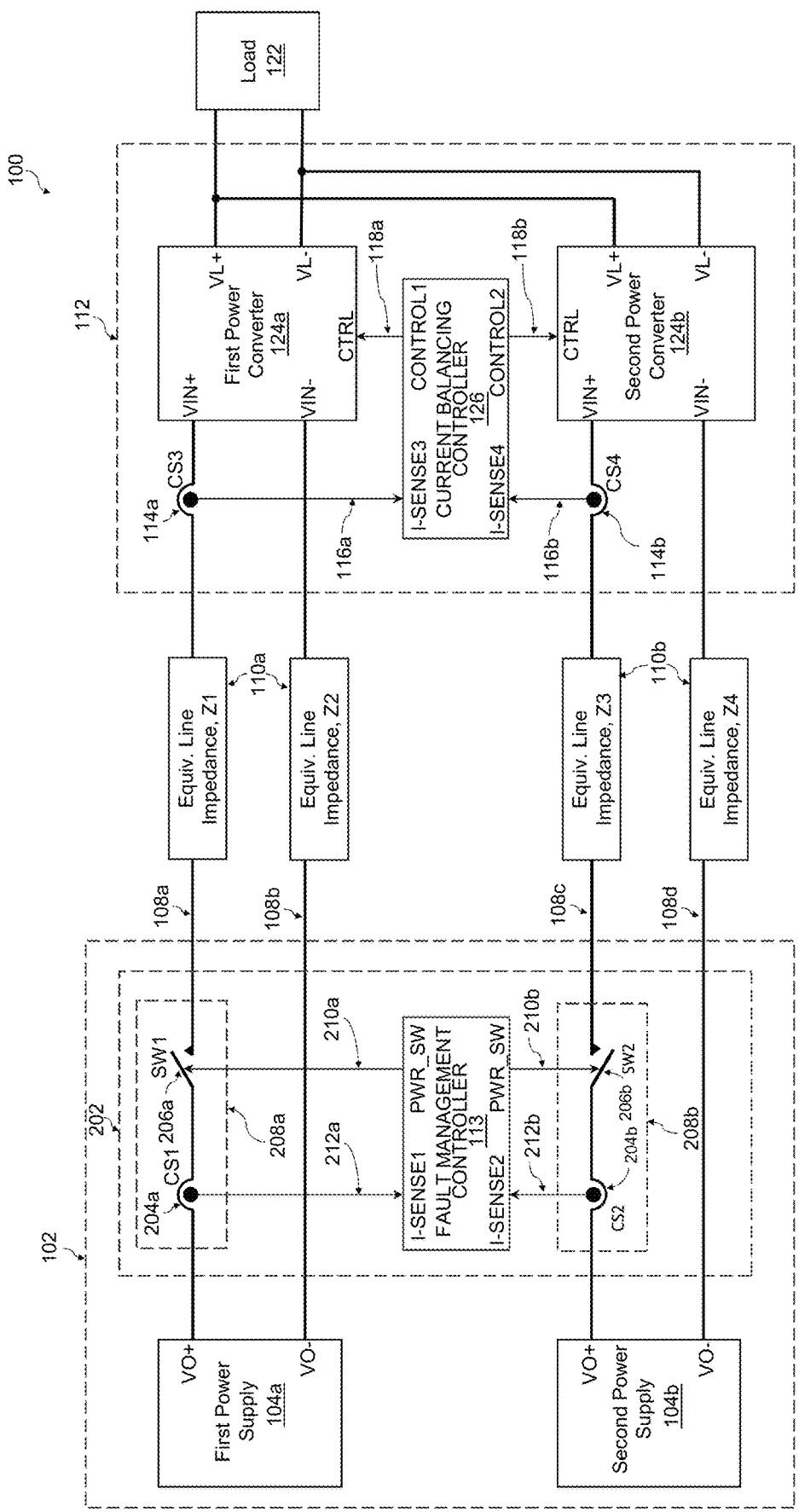
FIG. 2 is a block diagram of a fault-responsive power system using active line current balancing that comprises a standalone fault controller, according to an example embodiment.

Referring now to FIG. 2, there is depicted another example embodiment of the fault-responsive power system 100. The system 100 of FIG. 2 is depicted as being identical to that of FIG. 1 except the communication link 106 between the first and second power supplies 104a,b of FIG. 1 is shown as being implemented using voltage reduction circuitry 202. The voltage reduction circuitry 202 comprises a fault management controller 113; first and second supply-side current sensors 204a,b located along the first and third conductors 108a,c to measure the first and second supply-side currents, respectively; and first and second switches 206a,b operable to control the first and second supply-side currents. For example and as discussed further below, in response to detecting a fault the first and second switches 206a,b may be modulated to reduce the supply-side currents, or opened for a sufficiently long duration to shut off the supply-side currents entirely. First and second supply-side current signals 212a,b representative of the magnitudes of the first and second supply-side currents are sent from the first and second supply-side current sensors 204a,b to the fault management controller 113, respectively. In normal operation absent a fault, the current balancing controller 126 keeps the remote-side currents in balance within the magnitude threshold, and the supply-side currents are consequently also balanced within the magnitude threshold.

Figure 5:
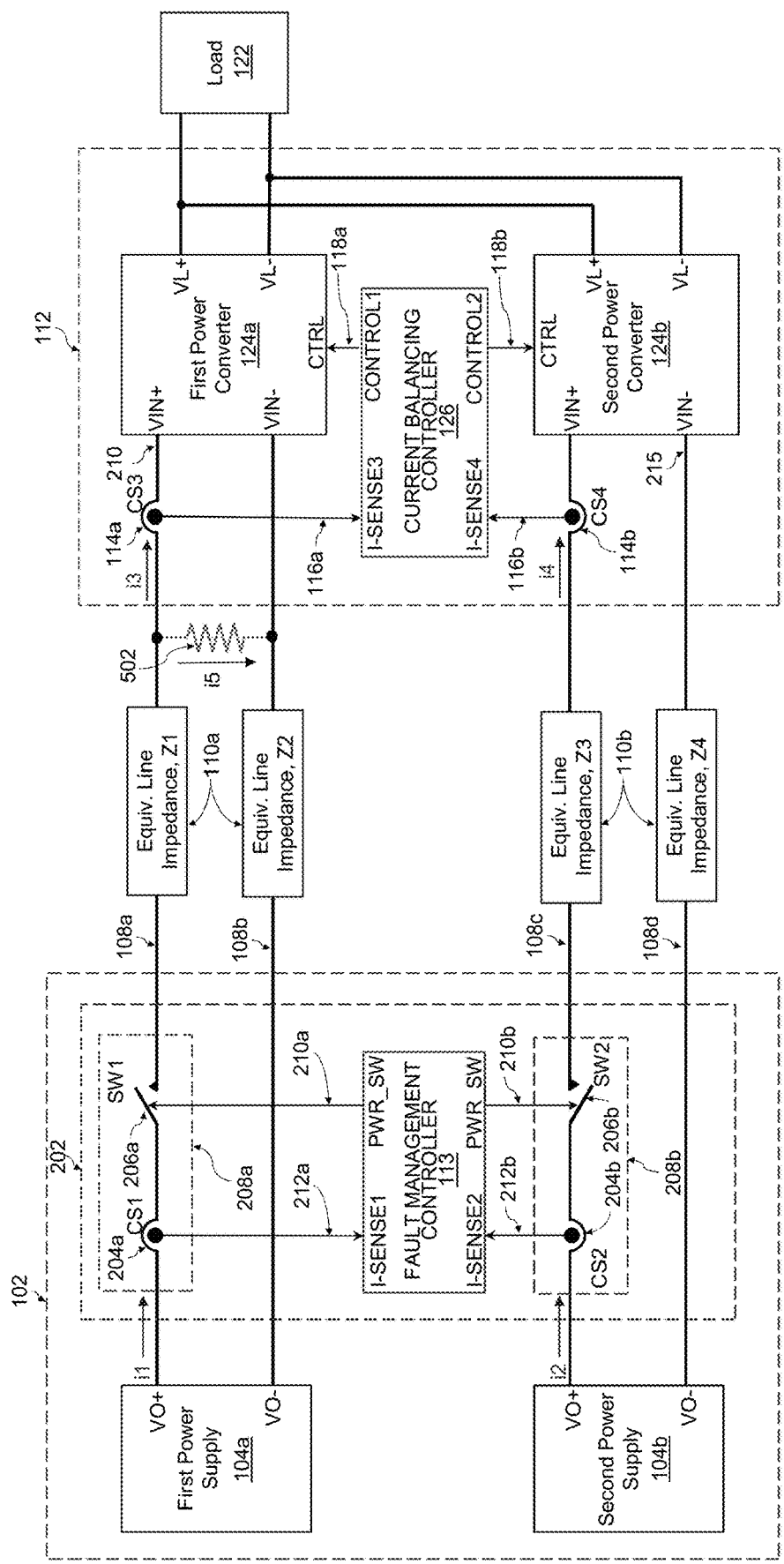
FIG. 5 is a block diagram of the system of FIG. 2 depicting the flow of line currents and their relationship to one another in the presence of line-to-line fault caused by an external foreign body with certain impedance, according to an example embodiment.

FIG. 5 shows the operation of the system 100 of FIG. 2 when a person causes a line-to-line fault. The person causing the fault is represented in FIG. 5 as a resistor 502 electrically coupling the first and second conductors 108a,b together. The first and second supply-side currents are respectively labeled i1 and i2, the first and second remote-side currents are respectively labeled i3 and i4, and the body current traveling through the person causing the fault is labeled i5. In normal operation, i5=0 A and i1=i2=i3=i4. However, in a fault condition, i1=i3+i5, while i3=i4=i2. Consequently, in a fault condition i1>i2 by more than the magnitude threshold. The values of i1 and i2 are obtained by the first and second supply-side current sensors 204a,b and transmitted to the fault management controller 113 via the first and second supply-side current signals 212a,b, respectively. When the fault management controller 113 determines that i1 and i2 differ by more than the magnitude threshold, it opens or modulates the first and second switches 206a,b by sending the first and second switch control signals 210a,b, respectively, thereby shutting off the first and second supply-side currents and discontinuing power transmission or reducing the currents to non-zero values until their differential is less than the magnitude threshold.

While the fault management controller 113 may reduce and in some cases shut off the supply-side currents immediately in response to determining that the difference between the first and second supply-side currents at least meets the magnitude threshold, in at least some embodiments the fault management controller 113 may reduce or shut off the supply-side currents only after that difference has at least met the magnitude threshold for at least a duration threshold. This is depicted in the example method 1100 of FIG. 11, which is for performance by the fault management controller 113.

Figure 11:
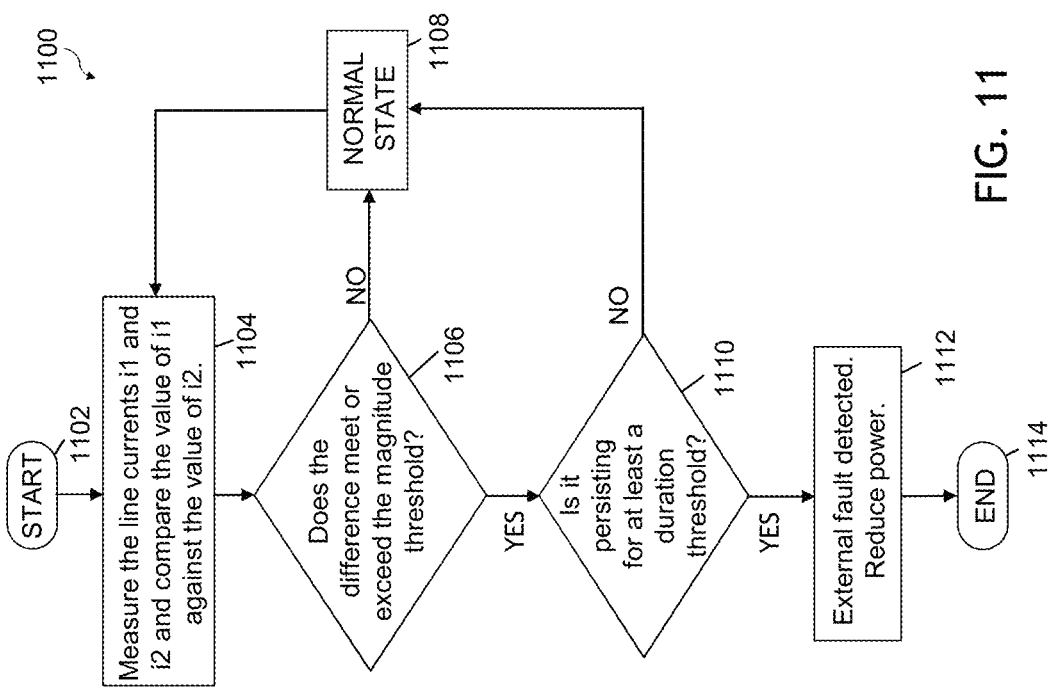
FIG. 11 is a flowchart illustrating a method applied by the fault management controller of FIGS. 2, 3, and 5, according to an example embodiment.

In FIG. 11, the method 1100 starts at block 1102 and proceeds to block 1104 where the fault management controller 113 measures currents i1 and i2 (the first and second supply-side currents) and determines the difference between them. At block 1106, the fault management controller 113 determines whether the difference between i1 and i2 at least meets the magnitude threshold; if no, the fault management controller 113 proceeds to block 1108 and sets itself to a normal (i.e., non-fault) state. The fault management controller 113 then proceeds back to block 1104. This is as described above in respect of FIG. 5 for normal operation.

In contrast to the description of FIG. 5 above, if the difference between i1 and i2 does at least meet the magnitude threshold the fault management controller 113 when applying the method 1100 of FIG. 11 then determines whether the difference persists for at least a duration threshold at block 1110 (e.g., the magnitude threshold may be 200 mA, and the duration threshold may be 10 ms). If no, the fault management controller 113 determines that the system 100 is operating normally at block 1108 and then returns to block 1104. However, if yes, the fault management controller 113 proceeds to block 1112 where it determines that an external fault is present and consequently reduces and in at least some embodiments shuts off the first and second supply-side currents using the first and second switch control signals 210a,b. After block 1112, the fault management controller 113 proceeds to block 1114 where the method 1100 ends.

In at least some example embodiments, the fault management controller 113 may comprise a processor communicatively coupled to a non-transitory computer readable medium that has stored on it computer program code that is executable by the processor and that, when executed by the processor, causes the fault management controller 113 to perform the example methods described above, such as the method 1100 of FIG. 11. Alternatively, and as described further below, the fault management controller 113 may be implemented using application specific circuitry.

Figure 3:
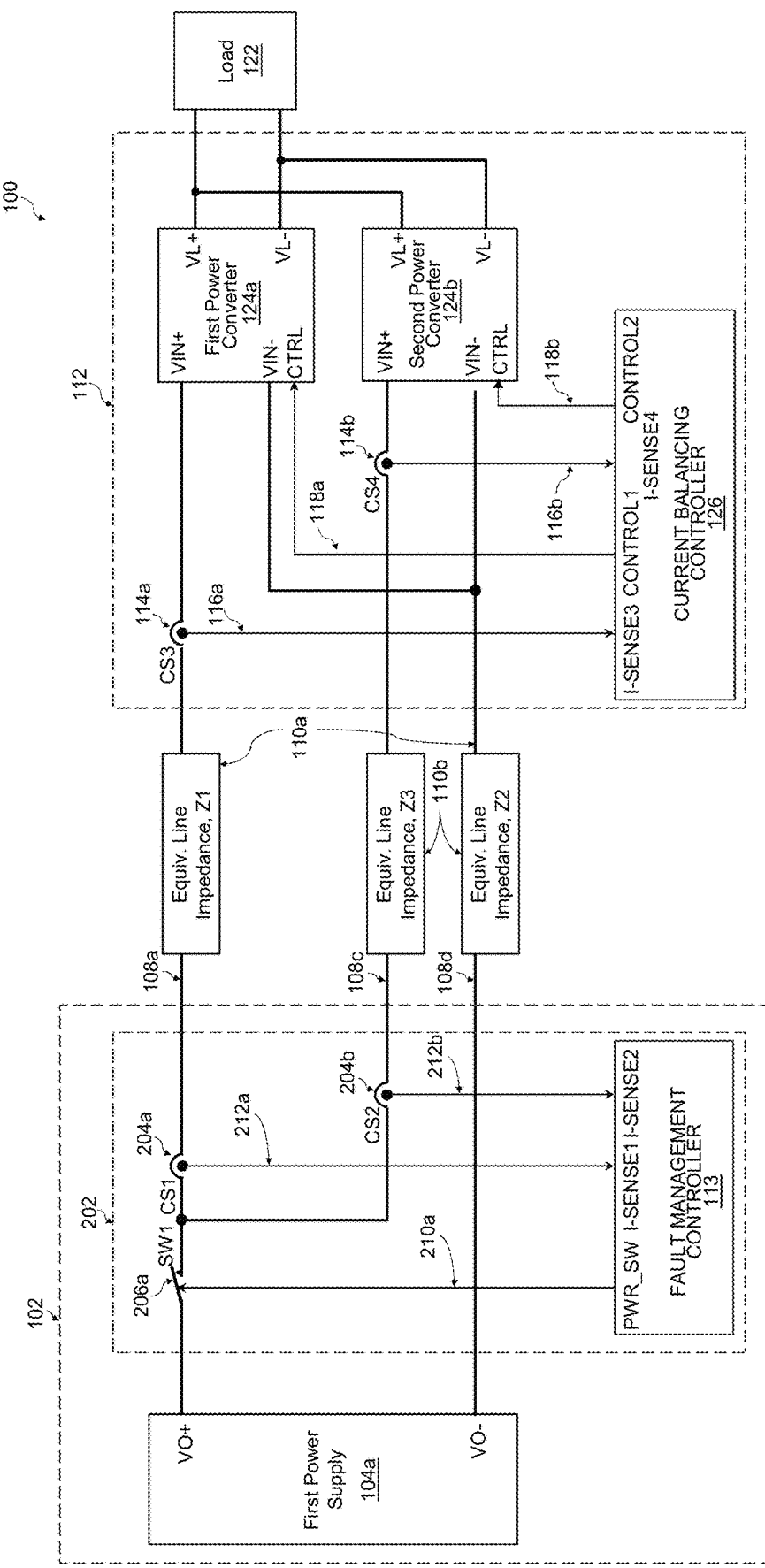
FIG. 3 is a block diagram of a fault-responsive power system using active line current balancing that comprises a standalone fault controller and a three-conductor transmission line, according to an example embodiment.

Referring now to FIG. 3, there is shown another example embodiment of the fault-responsive power system 100. The system 100 of FIG. 3 is depicted as being identical to that of FIG. 2 except that instead of the first through fourth conductors 108a-d transferring power from the first and second power supplies 104a,b to the first and second power converters 124a,b, only the first power supply 104a is used. The first conductor 108a electrically connects the first power supply's 104a positive terminal V0+ to the first power converter's 124a positive terminal VIN+, and the fourth conductor 108d electrically connects the first power supply's 104b negative terminal V0− to the first power converter's 124a negative terminal VIN− and to the second power converter's 124b negative terminal VIN−. Downstream (i.e., towards the remote-side) from the first switch 206a, the third conductor 108c branches off from the first conductor 108a and is electrically connected to the second power converter's 124b positive terminal VIN+. Consequently, the first conductor pair 110a comprises the first and fourth conductors 108a,d, and the second conductor pair 110b comprises the third and fourth conductors 108c,d. The fourth conductor 108d accordingly acts as a common return line for both of the conductor pairs 110a,b. As in the embodiments of the system 100 shown in FIGS. 1 and 2, the fault management controller 113 of the system 100 of FIG. 3 receives the first and second supply-side current signals 212a,b representative of the first and second supply-side currents, and in response to a measured current imbalance in excess of the magnitude threshold (and optionally for longer than the duration threshold) the fault management controller 113 uses the first switch control signal 210a to open the first switch 206a. As the first and third conductors 108a,c are shorted together downstream of the first switch 206a, opening only the first switch 206a is sufficient to shut off the first and second supply-side currents. As mentioned above, as an alternative to simply opening the first switch 206a and keeping it open to shut off the first and second supply-side currents entirely, the fault management controller 113 may alternatively modulate the first switch 206a to reduce the magnitudes of the first and second supply-side currents to non-zero values such that their differential is less than the magnitude threshold.

Figure 6:
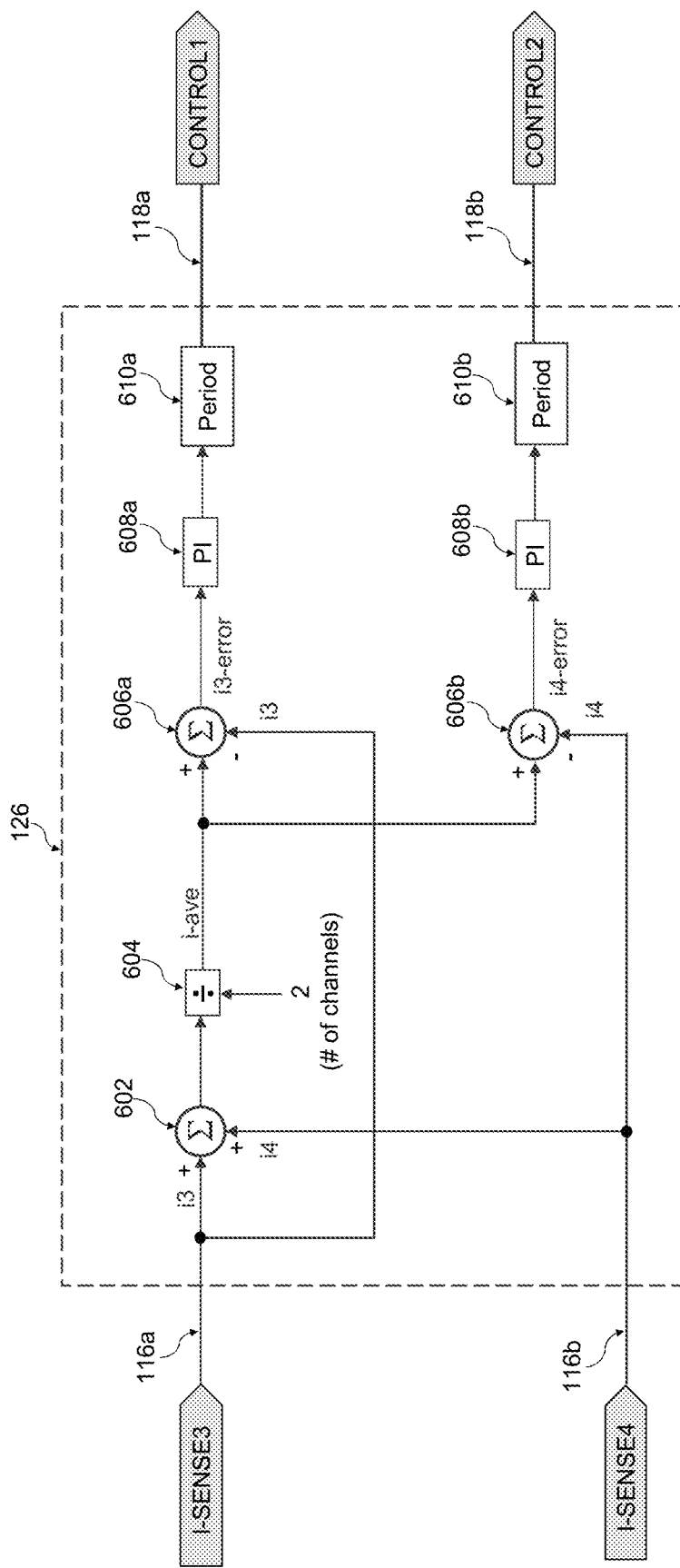
FIG. 6 is a block diagram of a current balancing controller shown in FIGS. 1-3 and 5, according to an example embodiment.

Referring now to FIG. 6, there is shown a block diagram of the current balancing controller 126 according to an example embodiment. FIG. 6 shows that the current balancing controller 126 receives as inputs the first and second remote-side current signals 116a,b and, based on them, determines and outputs the first and second control signals 118a,b to the first and second power converters 124a,b, respectively.

The current balancing controller 126 comprises a current averaging circuit electrically coupled to the first and second remote-side current sensors 114a,b to receive the first and second remote-side current signals 116a,b for determining an average remote-side current. More particularly, the current averaging circuit comprising a current average summing circuit 602 that receives the first and second control signals 118a,b respectively representing magnitudes of the first remote-side current (i3 in FIG. 6) and the second remote-side current (i4 in FIG. 6). The current average summing circuit 602 sums those magnitudes together and outputs the result to a divider circuit 604 to determine an average remote-side current (i-ave in FIG. 6).

The average remote-side current is input to a first current summing circuit 606a, which determines the difference between i-ave and i3. The output of the first current summing circuit 606a is accordingly a first remote-side current error (i3-error in FIG. 6). The first remote-side current error is input to a first compensation circuit, which comprises a first proportional-integral compensator 608a that receives the first remote-side current error and outputs a signal to a first period equivalent circuit 610a that determines the period equivalent of the first remote-side current error and outputs it as the first control signal 118a. As discussed further below in respect of FIGS. 7 and 8, the first control signal 118a accordingly represents a basis on which to determine the period of the signal used to control primary switches comprising part of the first power converter 124a to adjust the input impedance or gain of the first power converter 124a and consequently the first remote-side current.

The average remote-side current is also input to a second current summing circuit 606b, which determines the difference between i-ave and i4 as a second remote-side error (i4-error in FIG. 6). The second remote-side current error is input to a second compensation circuit that comprises a second proportional-integral compensator 608b and a second period equivalent circuit 610b that determine and output the second control signal 118b in a manner analogous to that described above for the first control signal 118a.

In lieu of using the first and second proportional-integral compensators 608a,b, in at least some alternative embodiments (not depicted) different types of compensators, such as modified proportional-integral or a 2-pole 2-zero compensator, may be used. Additionally, while in FIG. 6 the first and second control signals 118a,b are a period equivalent, in at least some alternative embodiments (not depicted) they may represent a duty cycle when the control switches comprising part of the first and second power converters 124a,b are controlled using pulse width modulation as noted further below.

The current balancing controller 126 may be implemented digitally using, for example, a microcontroller or digital signal processor with built-in math co-processor to perform real-time calculations of the first and second remote-side current errors and related compensation parameters and to then generate the first and second control signals 118a,b.

Figure 7:
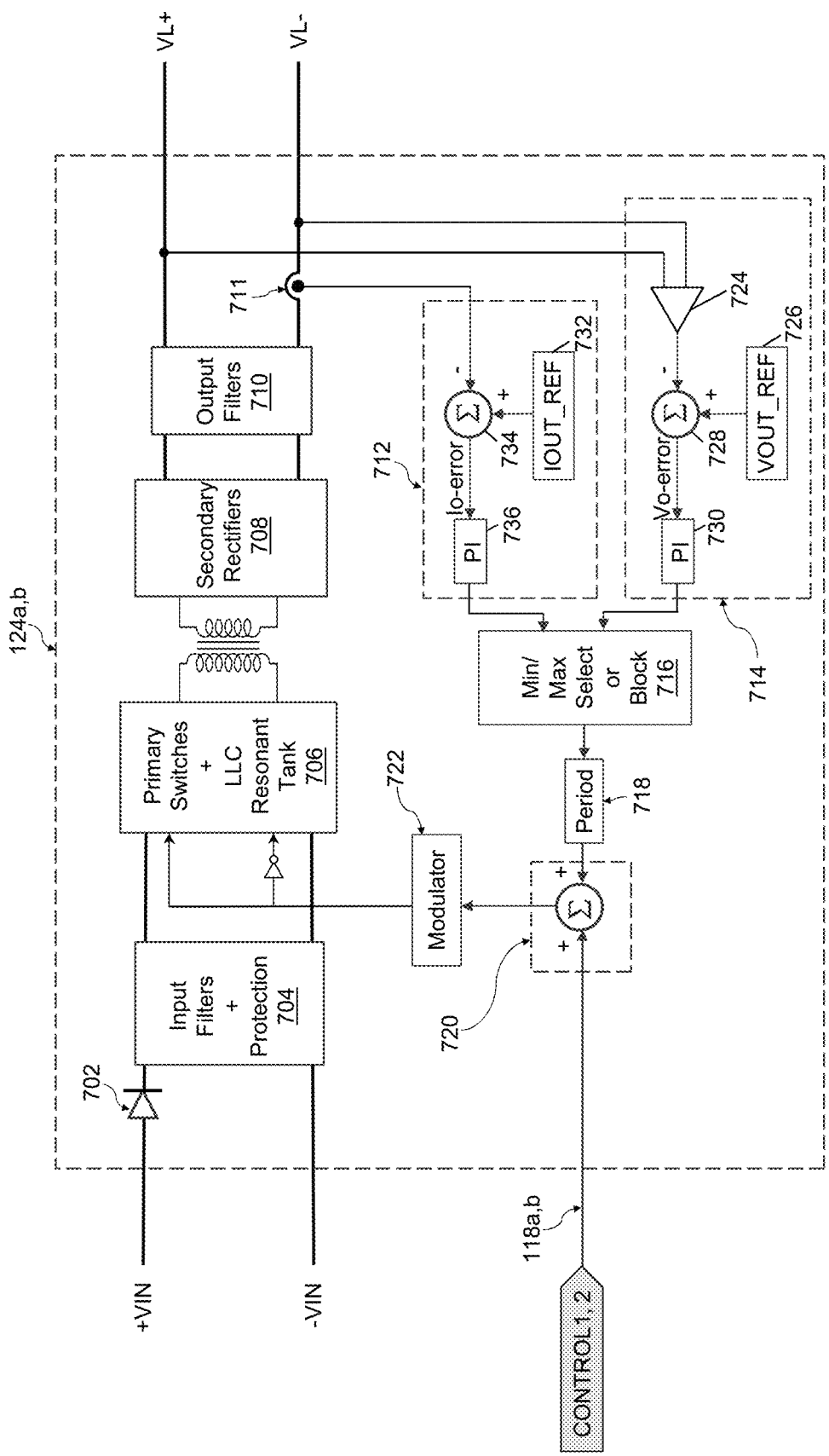
FIGS. 7 and 8 are block diagrams of a DC-DC converter that may be used as either power converter of the systems shown in FIGS. 1-3 and 5, according to various example embodiments.
Figure 8:
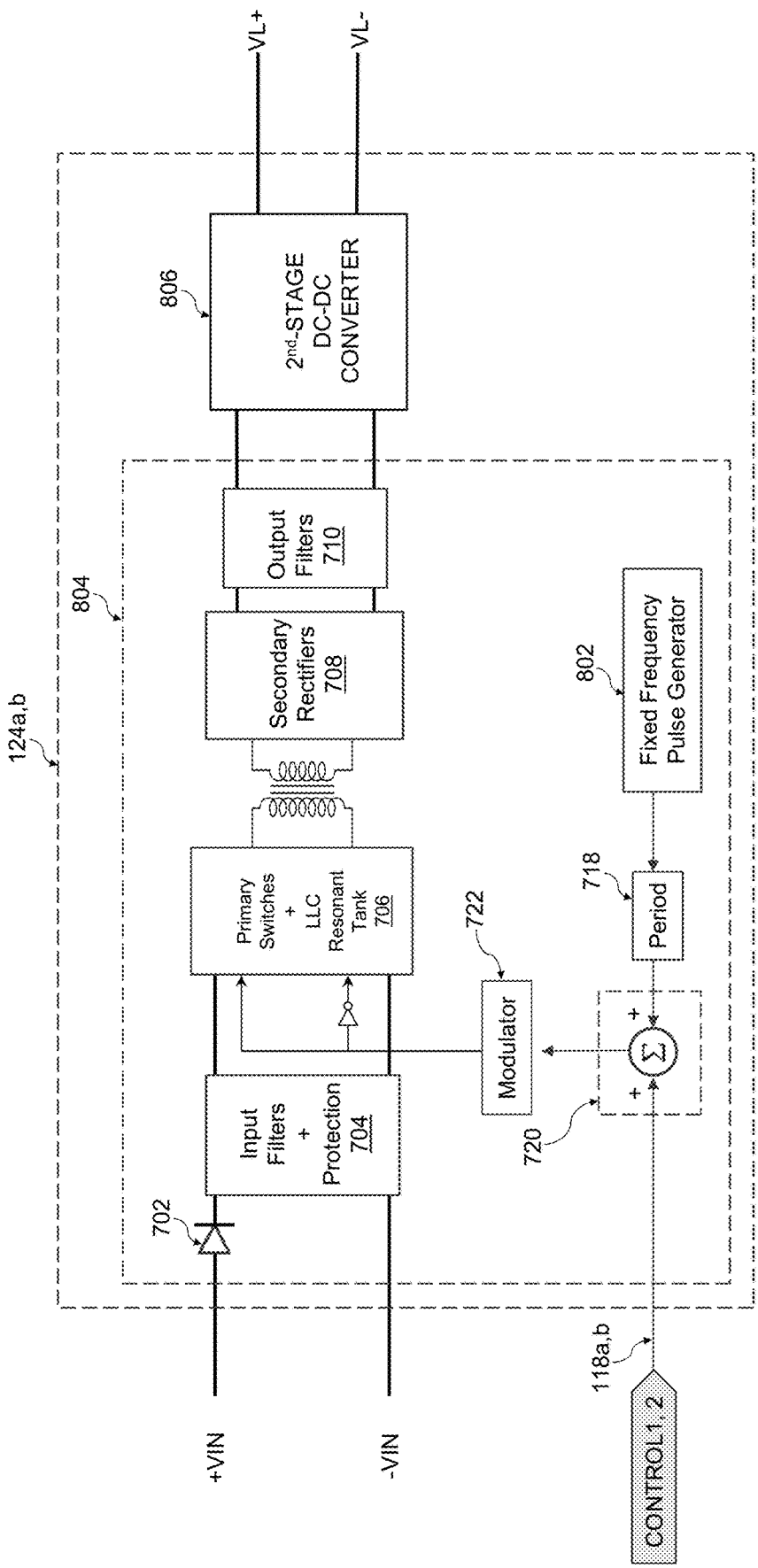

FIGS. 7 and 8 are block diagrams of either of the power converters 124a,b, according to additional example embodiments. In FIG. 7, power at the positive terminal of the power converters 124a,b is rectified by a diode 702 and conditioned in series by a resonant LLC topology comprising primary switches and an LLC resonant tank circuit 706, secondary rectifiers 708, and output filters 710; this may collectively comprise, for example, a 1500 W 400V-to-54V Full Bridge LLC Resonant DC-DC Converter. The primary switches of the circuit 706 are modulated in response to a drive signal as discussed further below. This modulation controls the input impedance or gain of the power converters 124a,b, which accordingly adjusts the amount of current entering the power converters 124a,b.

The power converters 124a,b use closed-loop feedback control. More particularly, a current loop control circuit 712 receives the value of the current output by the power converters 124a,b while a voltage loop control circuit 714 measures the voltage across the output terminals VL+ and VL− of the power converters 124a,b using a voltage sensor 724. The current loop control circuit 712 determines the difference between the current output by the power converters 124a,b and a current reference 732 (i.e., maximum current limit) at a summing circuit 734, and outputs this difference as a current error (labeled Io-error in FIG. 7) to a compensator 736. The compensator 736 is shown as a proportional-integral compensator, although in alternative embodiments (not depicted) the compensator 736 may be of a different type, such as modified proportional-integral or a 2-pole 2-zero compensator.

Analogous to the current loop control circuit 712, the voltage loop control circuit 714 determines the difference between the voltage output by the power converters 124a,b and a voltage reference 726 (i.e., final output voltage setting) at summing circuit 728, and outputs this difference as a voltage error (labeled Vo-error in FIG. 7) to a compensator 730. The compensator 730 is shown as a proportional-integral compensator, although in alternative embodiments (not depicted) the compensator 730 may be of a different type, such as modified proportional-integral or a 2-pole 2-zero compensator.

The outputs of the current and voltage loop control circuits 712,714 are sent to a min/max selector block 716. The min/max selector block 716 compares the signals received from the current and voltage loop control circuits 712,714, selects the signal that represents the maximum frequency (when frequency modulation is used) or the minimum duty cycle (when pulse width modulation ["PWM"] is used), and relays that signal to a period equivalent circuit 718. The period equivalent circuit 718 is analogous to the circuits 610a,b discussed above and determines the period equivalency of the selected signal. That period equivalency is summed with the first control signal 118a (for the first power converter 124a) or the second control signal 118b (for the second power converter 124b) using summing circuitry 720, with the resulting signal being converted into the drive signal at a modulator 722. The drive signal is used to control how the primary switches of the circuit 706 are modulated, thereby adjusting the power converters' 124a,b input impedance or gain and controlling the magnitudes of the supply-side currents. As in FIG. 6, as an alternative to the period equivalent circuit 718 in at least some alternative embodiments (not depicted) the drive signal may represent a duty cycle when the control switches comprising part of the first and second power converters 124a,b are controlled using pulse width modulation as noted further below.

While the power converters 124a,b use parallel current and voltage loop control circuits 712,714 in FIG. 7, alternative embodiments (not depicted) may use only one of the current and voltage loop control circuits 712,714 or series/cascading current and voltage loop control circuits 712,714.

FIG. 8 depicts an embodiment of the power converters 124a,b that relies on a two-stage cascaded implementation as opposed to voltage and/or current feedback loops as in FIG. 7, with the result being the power converters 124a,b of FIG. 8 are simpler to implement than those of FIG. 7. Each of the power converters 124a,b comprises a first stage 804 that receives the first and second remote-side currents, and a second stage 806 electrically coupled to the output of the first stage. The output of the second stage 806 comprises the power converters' 124a,b output terminals VL+ and VL−.

The second stage 806 comprises a standalone DC-DC converter. Like the power converters 124a,b of FIG. 7, in the first stage 804 power at the positive terminal of the power converters 124a,b is rectified by a diode 702 and conditioned in series by a resonant LLC topology comprising primary switches and an LLC resonant tank circuit 706, secondary rectifiers 708, and output filters 710. However, instead of using a feedback loop comprising the current loop control circuit 712 and/or the voltage loop control circuit 714, the first stage 804 implement open-loop control using a fixed frequency pulse generator 802 that outputs a pre-defined and fixed frequency (or a fixed duty cycle in the case of PWM). This frequency is input to the period equivalent circuit 718 and summed with the first control signal 118a (for the first power converter 124a) or the second control signal 118b (for the second power converter 124b) using the summing circuitry 720, with the resulting signal being converted into the drive signal at a modulator 722. The drive signal is used to control the input impedance of the primary switches of the circuit 706 as described above in FIG. 7.

Figure 9:
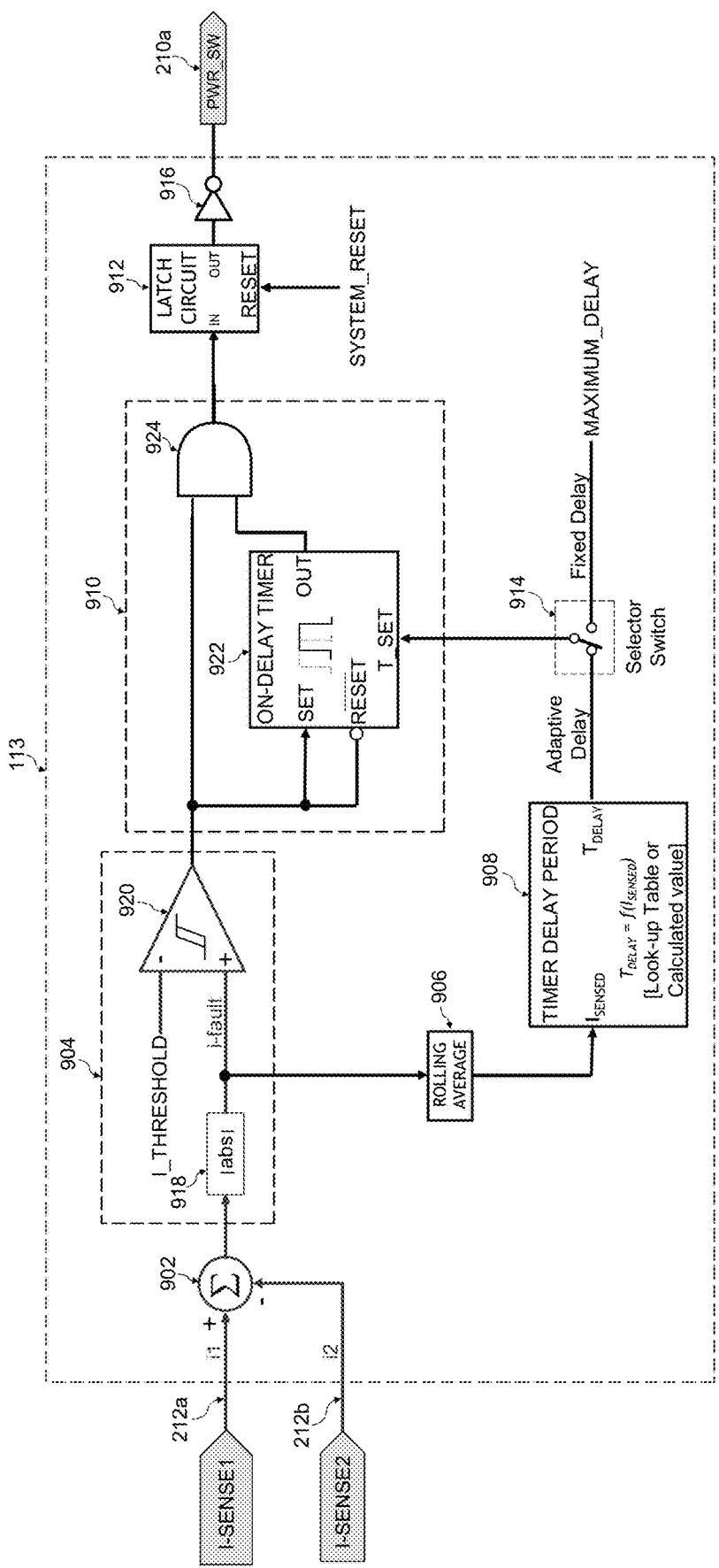
FIG. 9 is a block diagram of a logic circuit implementation of the fault management controller shown in FIG. 3, according to an example embodiment.

FIG. 9 is a block diagram of a logic circuit implementation of the fault management controller 113 shown in FIG. 3, according to an example embodiment. The circuitry shown in FIG. 9 depicts the terminal for the first switch control signal 210a and not the terminal for the second switch control signal 210b as it does in FIG. 3; however, another terminal may be added and shorted to the terminal for the first switch control signal 210a in order to make the circuitry of FIG. 9 suitable for use as the fault management controller 113 shown in FIGS. 1, 2, and 5.

In FIG. 9, the fault management controller 113 receives as input the first supply-side current signal 212a (labeled i1 in FIG. 9) from the first supply-side current sensor 204a and the second supply-side current signal (labeled i2 in FIG. 9) from the second supply-side current sensor 204b. The current signals 212a,b are input to current summing circuitry 902, which generates a differential current signal representing a difference between the first and second supply-side currents. This current signal is input to current signal qualifying circuitry 904. This functionality may be implemented digitally using, for example, a microcontroller or digital signal processor, or using analog circuitry such as an op-amp.

The current signal qualifying circuitry 904 comprises absolute value processing circuitry 918 that determines the absolute value of the differential current signal, and outputs a signal labeled i-fault in FIG. 9 to the positive terminal of a comparator 920. A signal labeled I_THRESHOLD in FIG. 9, which corresponds to the magnitude threshold, is input to the negative terminal of the comparator 920. The output of the comparator 920 is driven high if the current signal at least meets the magnitude threshold and is otherwise driven low.

The comparator's 920 output is sent to signal on-delay circuitry 910. In particular, the comparator's 920 output restarts an on-delay timer 922 that drives its output high when the duration threshold has passed. The comparator's 920 output and the on-delay timer's 922 output are both input to an AND gate 924. Consequently, only when both the comparator's 920 output is high (indicating that the difference between the first and second supply-side currents at least meets the magnitude threshold) and the on-delay timer's 922 output is high (indicating that the difference between the first and second supply-side currents has at least met the magnitude threshold for at least the duration threshold) is the output of the AND gate 924 high. The output of the AND gate 924 is used as the output of the signal on-delay circuitry and acts as a "fault signal" that is the basis of the first switch control signal 210a. More particularly, the fault signal is input to a latch circuit 912, which drives an inverter 916. The output of the inverter 916 is driven low in response to the high fault signal, and the inverter's 916 output is used as the first switch control signal 210a. The output of the latch circuit 912 remains low until the system 100 and consequently also the latch circuit 912 is reset using the SYSTEM RESET signal.

The value of the duration threshold applied by the on-delay timer 922 is determined by the signal applied to its T_SET input by a selector switch 914. The selector switch 914 is movable between a first state in which it sets the T_SET input to a fixed delay and a second state in which it sets the T_SET input to an adaptive delay. The fixed delay is set to a maximum safe delay corresponding to the MAXIMUM DELAY signal of FIG. 9. As discussed further in respect of FIG. 10 below, the maximum safe delay is typically set to between 5 ms to 10 ms or lower.

The adaptive delay is determined using timer delay period circuitry 908 that is electrically coupled to the current summing circuitry 902 to receive the current signal representing the difference between the first and second supply-side currents. More particularly, in the embodiment of FIG. 9 the absolute value of the current signal is input to rolling average process circuitry 906 (as an alternative to a rolling average, a sliding window may be used, or alternatively the rolling average process circuitry 906 may be omitted) that determines a rolling average of the current signal over a pre-determined averaging window; this helps to smooth out noise in the current signal. The rolling average is used as input to the timer delay period circuitry 908, which may determine the duration threshold using, for example, a lookup table indexed by i-fault, or by performing a calculation at runtime based on i-fault, as discussed further in respect of FIG. 10 below.

Figure 12:
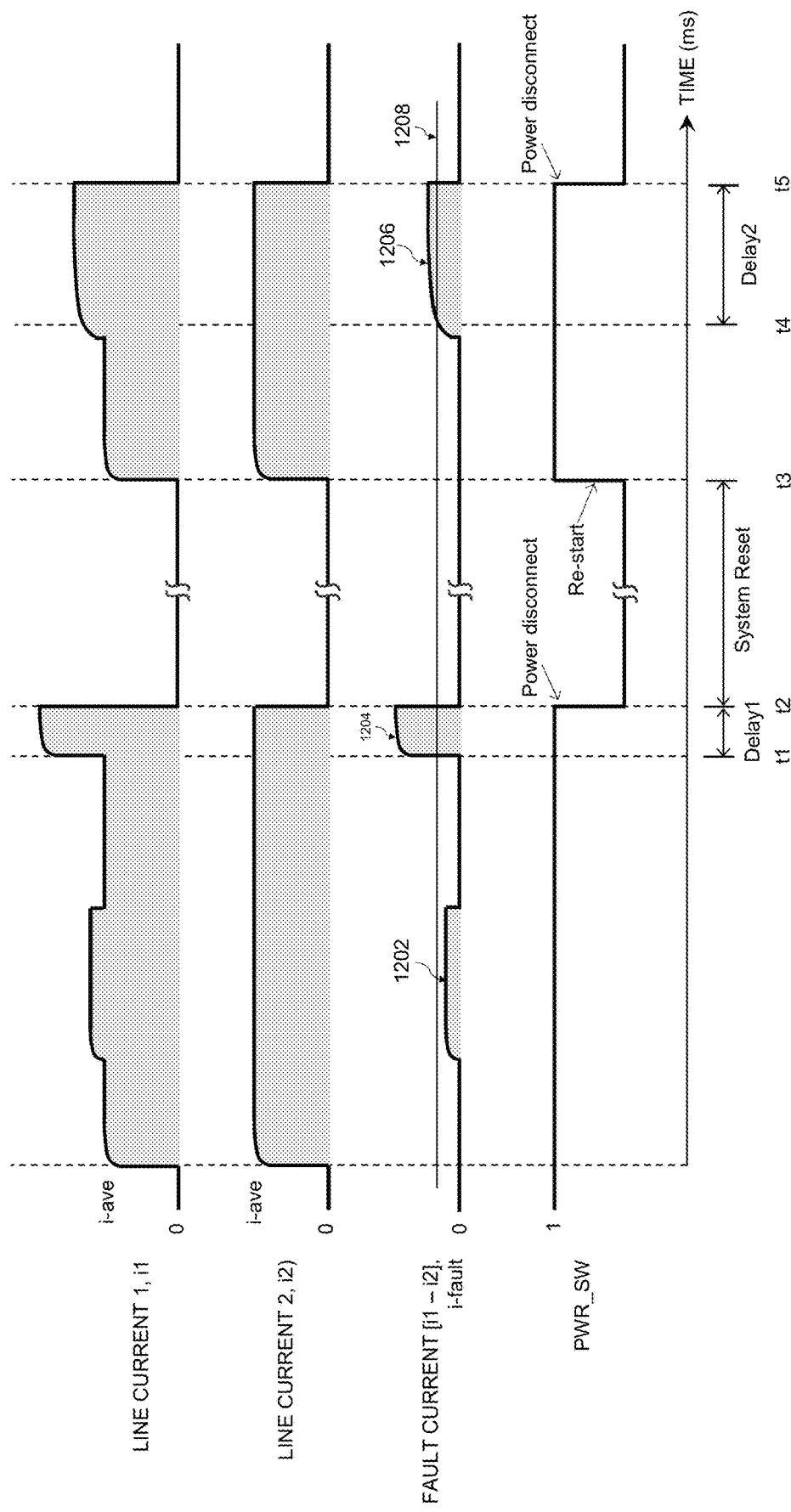
FIG. 12 is a timing diagram illustrating a timing sequence of current signals and consequent fault response of the fault-responsive power system, according to an example embodiment.

Referring now to FIG. 12, there is shown a timing diagram illustrating a timing sequence of the first and second supply-side current signals respectively labeled i1 and i2 and consequent fault response of the fault-responsive power system 100, according to an example embodiment. The timing diagram also shows the magnitude threshold 1208, the difference between the first and second supply-side current signals labeled i1–i2 (labeled i-fault), and the value of the first switch control signal 210a labeled PWR_SW for which a high value represents the first switch 206a being closed and a low value represents the first switch 206a being open. For each of the first and supply-side current signals, the average current is labeled i-ave on the diagram.

The time axis in FIG. 12 shows times t1, t2, t3, t4, and t5, for which t1<t2<t3<t4<t5. Prior to t1, the first switch 206a is closed as i1–i2 does not meet or exceed magnitude threshold 1208. In particular, a first current surge 1202 prior to t1 does not meet or exceed magnitude threshold 1208 and consequently does not trigger a fault response from the system 100. Between t1 and t2, a second current surge 1204 does meet or exceed magnitude threshold 1208 for at least the duration threshold labeled Delay1, and consequently at t2 PWR_SW is driven low, the first switch 206a opens, and i1 and i2 go to zero. The system is reset after t2 and resumes normal operation at t3 until t4. Between t4 and t5, a third current surge 1206 again meets or exceeds magnitude threshold 1208 for at least the duration threshold labeled Delay 2, and consequently PWR_SW is again driven low at t5, the first switch 206a again opens, and i1 and i2 again go to zero.

Delay1 is shorter than Delay2 because the duration threshold used in connection with FIG. 12 is dynamic. More particularly, the fault management controller 113 dynamically determines the duration threshold based on the rolling average of i1-i2 as described above in respect of FIGS. 9 and 10 for example.

Figure 10:
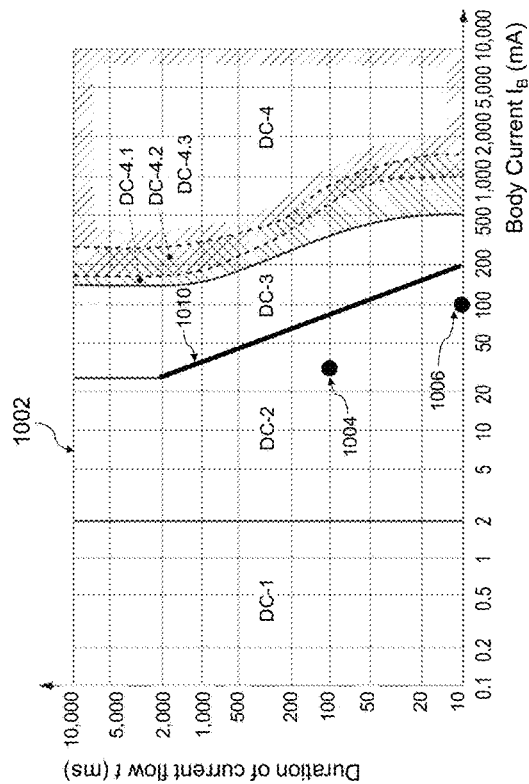
FIG. 10 illustrates a graph of different regions that are categorized into safe and un-safe zones according to the IEC 60479-1 standard as well as a table that shows the relationship between body current and allowable maximum duration.

Referring now to FIG. 10, there is shown a graph 1002 of fault current vs. maximum allowable current flow duration time that includes different regions that are categorized into safe and un-safe zones according to the IEC 60479-1 standard, as well as a table 1008 that shows the relationship between body current and allowable maximum duration. The maximum allowable duration may be used as, or as a basis for determining, the duration threshold.

Zones DC-1 and DC-2 of the graph 1002 are categorized as safe regions and define the preferred operating zones for the system 100. DC-3 is the boundary between safe and un-safe regions, and this operating zone is preferentially avoided by the system 100. DC-4 is an un-safe or dangerous operating zone.

In at least some embodiments, the fault management controller 113 determines the actual value of any fault current, as opposed to other values used only as a proxy for the fault current (e.g. voltage decay, a different test voltage, change in current over time, etc.). The ability to quantifiably measure the magnitude of the fault current permits the system to implement a relatively resilient protection method using a variable or adaptive reaction time for the duration threshold. In certain situations, the ability to vary the duration threshold increases system reliability.

Points 1004 and 1006 respectively show examples of fixed maximum allowable duration times given a particular fault current. For example, point 1004 shows a maximum allowable duration of no more than 100 ms for a magnitude threshold of 30 mA, while point 1006 shows a maximum allowable duration of no more than 10 ms for a fault current of 100 mA. In prior art systems, which do not directly measure fault current or do not have a mechanism to quantify the actual fault current, the most common approach is to shut off current within 5-10 ms of detecting a fault, regardless of the magnitude of the fault current; this corresponds to the shortest time in the DC-2 region regardless of the detectable fault current. The problem with this approach is that it makes the protection circuit very sensitive and prone to false-positive or nuisance tripping. This is particularly problematic in outdoor installations where the power distribution system itself is subject to different noise transients in the field and other real-world electro-mechanical events such as ground potential rise, inductive coupling with other electrical conductors in proximity, and lightning surge transients. In the context of line powering in an outside plant ("OSP"), the spurious noise and line transients are magnified at light load conditions when the power transmission line is under-damped. An under-damped power transmission line does not easily suppress transient noise. Therefore, it makes sense to increase the fault qualifying time at no load or light load conditions to increase the likelihood that the fault event is valid and not just induced by any incidental noise as described above. If the power system does not have the ability for its protection system to have an adaptive duration threshold as a function of fault current, then practically the protection circuit must always be designed for worst-case scenario, which is the shortest reaction time possible in order to guarantee compliance with safety standards. This limitation is alleviated and addressed by permitting a dynamic duration threshold, such as discussed above in respect of FIG. 9.

In other words, by being able to closely quantify the magnitude of fault current, the duration threshold can be made more flexible, adaptive, or dynamic as set out in the corresponding current-time table 1008. The maximum timer delay period of the table 1008, which effectively corresponds to the duration threshold, is calculated as a function of the measured body fault current and is defined by the slope 1010, which corresponds to operation in the DC-2 zone.

There are two ways in which the system 100 may be configured to use a dynamic duration threshold in response to particular operating conditions. The first approach is by using a lookup table as set out in the "Static Value [Lookup Table]" column of the table 1008. This method provides a simpler design implementation for the control circuit; however, the resolution of the current-time parameters is dependent on the granularity or number of the terms in the lookup table.

The second approach is by calculating the duration threshold at run-time based on the following pre-defined equation: $T_{DELAY} = 7.293 \times 10^6 * (I_{SENSED})^{-2.548}$ which is determined from the slope 1010. This returns a continuous value for use as the duration threshold as a function of the sampled current $I_{SENSED}$ discussed above in respect of FIG. 9. While evaluating this equation at runtime provides more granularity, it also consumes more resources from the controller in terms of processing power, memory, etc. The practical consequences of this downside can be mitigated using relatively fast and high-memory processing circuitry capable of floating-point operation, such as a suitable microcontroller ("MCU") or digital signal processing ("DSP") chips. Alternative embodiments may use a different and still suitable formula for determining $T_{DELAY}$; for example, a fixed offset may be added to $I_{SENSED}$ to ensure a safety margin, the equation may be determined using a different value for the slope 1010 (for example if an AC current signal is being used), and/or an application-specific formula may be used.

In brief, if the measured fault current is lower, then the duration threshold can be made longer while still meeting the safe operating zone. On the other hand, if the measured fault current is higher, then the duration threshold is made shorter in order to reduce the hazardous condition of potential prolonged exposure in case of accidental contact from a person. An advantage of permitting an adaptive or dynamic duration threshold is that it makes the system 100 more resilient, robust, and flexible across a wider range of different applications.

Figure 13:
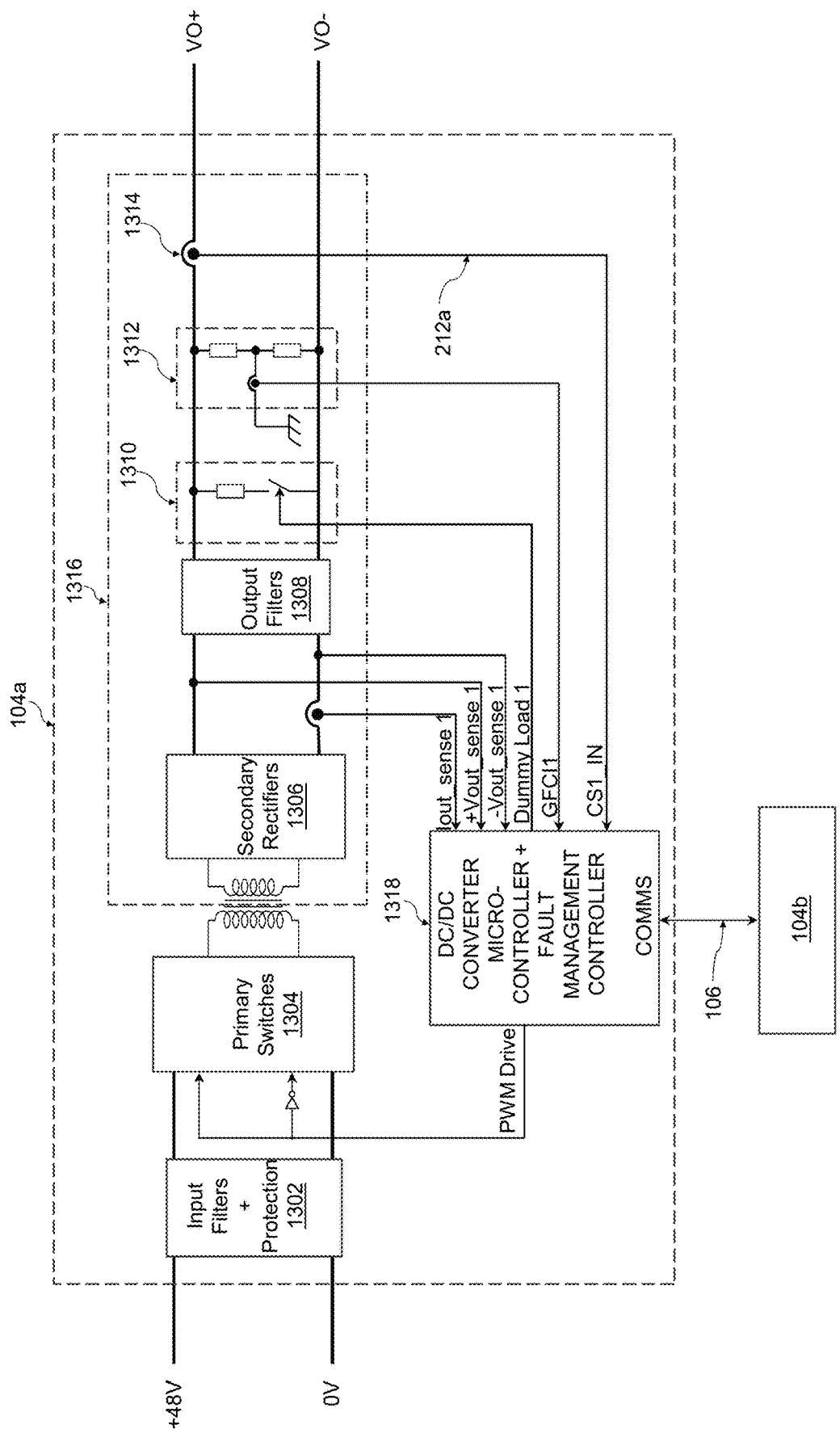
FIG. 13 is a block diagram of a power supply that may be used in the system of FIG. 1, according to an example embodiment.

Referring now to FIG. 13, there is depicted a block diagram of the first power supply 104a that may be used in the system 100 of FIG. 1, according to an example embodiment. An analogous construction may be used for the second power supply 104b.

In FIG. 13, 48 V (+48 V at one terminal and 0 V at the other terminal) is applied across the power supply's 104a input terminals. The voltage is sequentially processed by input filters and protection 1302, primary switches 1304, secondary rectifiers 1306, output filters 1308, an active dummy load 1310, and a ground-fault protection circuit 1312. Example circuitry may comprise or be based on, for example, a 2000 W 48V-to-400V Full Bridge LLC Resonant DC-DC Converter. This circuitry acts as a DC-to-DC converter that converts the 48 V input signal to a suitable output voltage; for example, +190V and −190V representing VO+ and VO− respectively. The secondary rectifiers 1306, output filters 1308, active dummy load 1310, and ground-fault protection circuit 1312 collectively comprise a secondary output circuit 1316. The controller 1318 is also communicatively coupled to the second power supply 104b via the communication link 106.

The fault management controller 113 is integrated into a combined DC-to-DC converter microcontroller and fault management controller 1318. The controller 1318 is electrically coupled to the primary switches 1304 so as to generate and send to the primary switches a drive signal labeled "PWM Drive" in FIG. 13 that disables the primary switches 1304 and thereby shut off the first supply-side current in response to a fault. Alternatively, in accordance with a corresponding PWM Drive signal, the switching operation of the primary switches 1304 can also be modulated to reduce the output VO+ and VO− to a safe level (e.g., 60V or less) in response to a fault. The controller 1318 applies the same logic as described above in respect of the fault management controller 113. The controller 1318 obtains the value of the first supply-side current via a current sensor 1314 and obtains the value of the second supply-side current via the communication link 106 from the second power supply 104b.

The active dummy load 1310 is controllable by the controller 1318 in order to provide a fast discharge on the output capacitors of the DC-DC converter. This helps voltage across the capacitors comprising part of the DC-DC converter to quickly decay to zero particularly at light load conditions, decreasing the likelihood of electrical shock.

The ground-fault protection circuit 1312 provides protection in the event of a line-to-ground fault. The ground-fault protection circuit 1312 may comprise, for example, a GFI or a high resistance midpoint ground system.

The communication link 106 connecting the first and second power supplies 104a,b permits them to be controlled by the one controller 1318. In an alternative embodiment (not depicted), the DC-to-DC converter is designed to have two identical but independent secondary output circuits 1316; one of the secondary output circuits 1316 is for the first power supply 104a and the other is for the second power supply 104b. This implementation renders the communication link 106 unnecessary.

Figure 14:
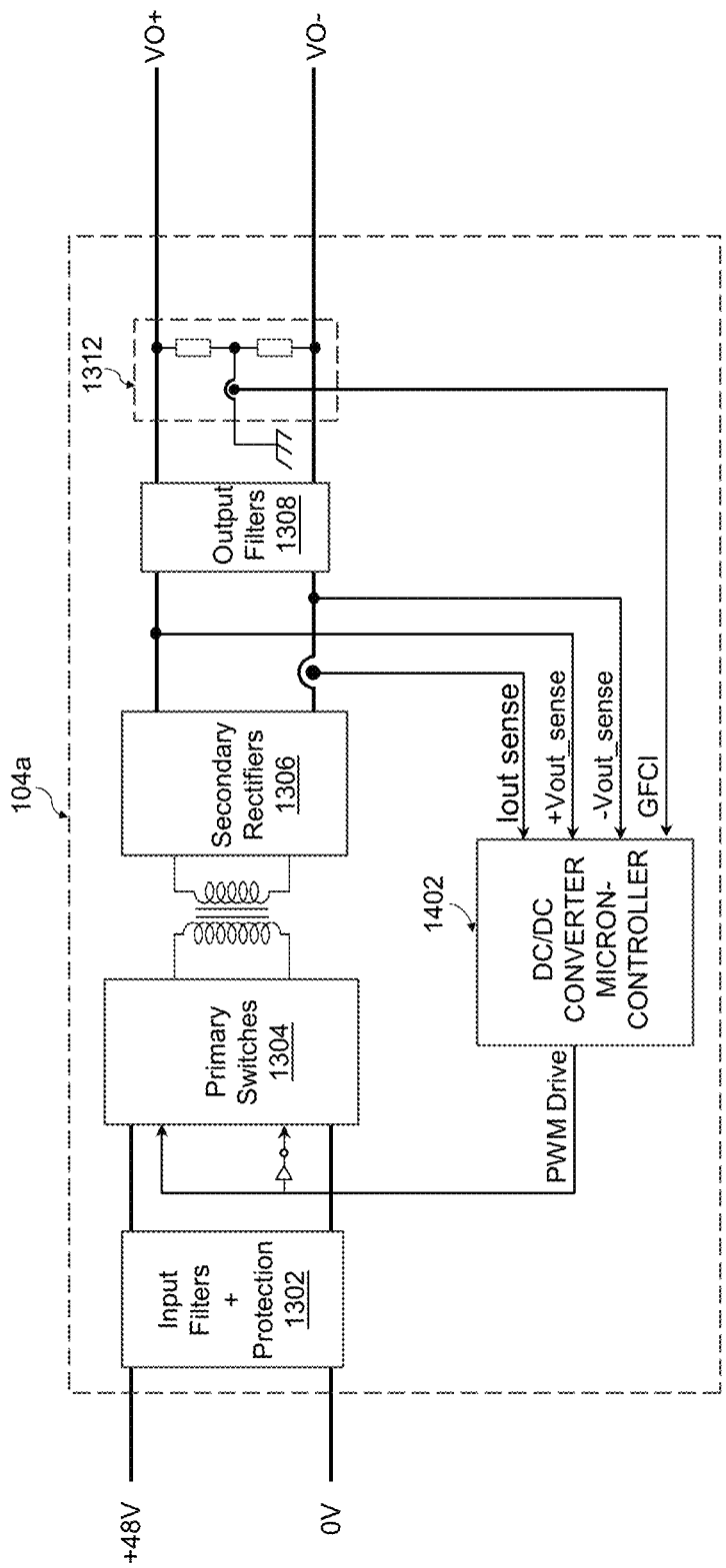
FIG. 14 is a block diagram of a power supply that may be used in the system of FIGS. 2, 3, and 5, according to an example embodiment.

Referring now to FIG. 14, there is depicted a block diagram of the first power supply 104a that may be used in the system of FIGS. 2, 3, and 5, according to an example embodiment. An analogous construction may be used for the second power supply 104b. Like the power supply 104a of FIG. 13, in the power supply 104a of FIG. 14 48 V (+48 V at one terminal and 0 V at the other terminal) is applied across the power supply's 104a input terminals. The voltage is sequentially processed by input filters and protection 1302, primary switches 1304, secondary rectifiers 1306, output filters 1308, and a ground-fault protection circuit 1312. Example circuitry may comprise or be based on, for example, a 2000 W 48V-to-400V Full Bridge LLC Resonant DC-DC Converter. This circuitry acts as a DC-to-DC converter that converts the 48 V input signal to a suitable output voltage; for example, +190V and −190V representing VO+ and VO− respectively. In contrast to the power supply 104a of FIG. 13, the fault controller 113 is external to the power supply 104a as depicted in FIGS. 2, 3, and 5. The power supply 104a of FIG. 14 comprises a DC-to-DC converter microcontroller 1402 which can shut off or reduce power as described above using the drive signal labeled "PWM Drive" in FIG. 14 to shut off or modulate the switching of the primary switches 1304. In FIG. 14, the microcontroller 1402 shuts off the power in response to a signal from the ground-fault protection circuit 1312 while the fault management controller 113 handles line-to-line faults.

Figure 15:
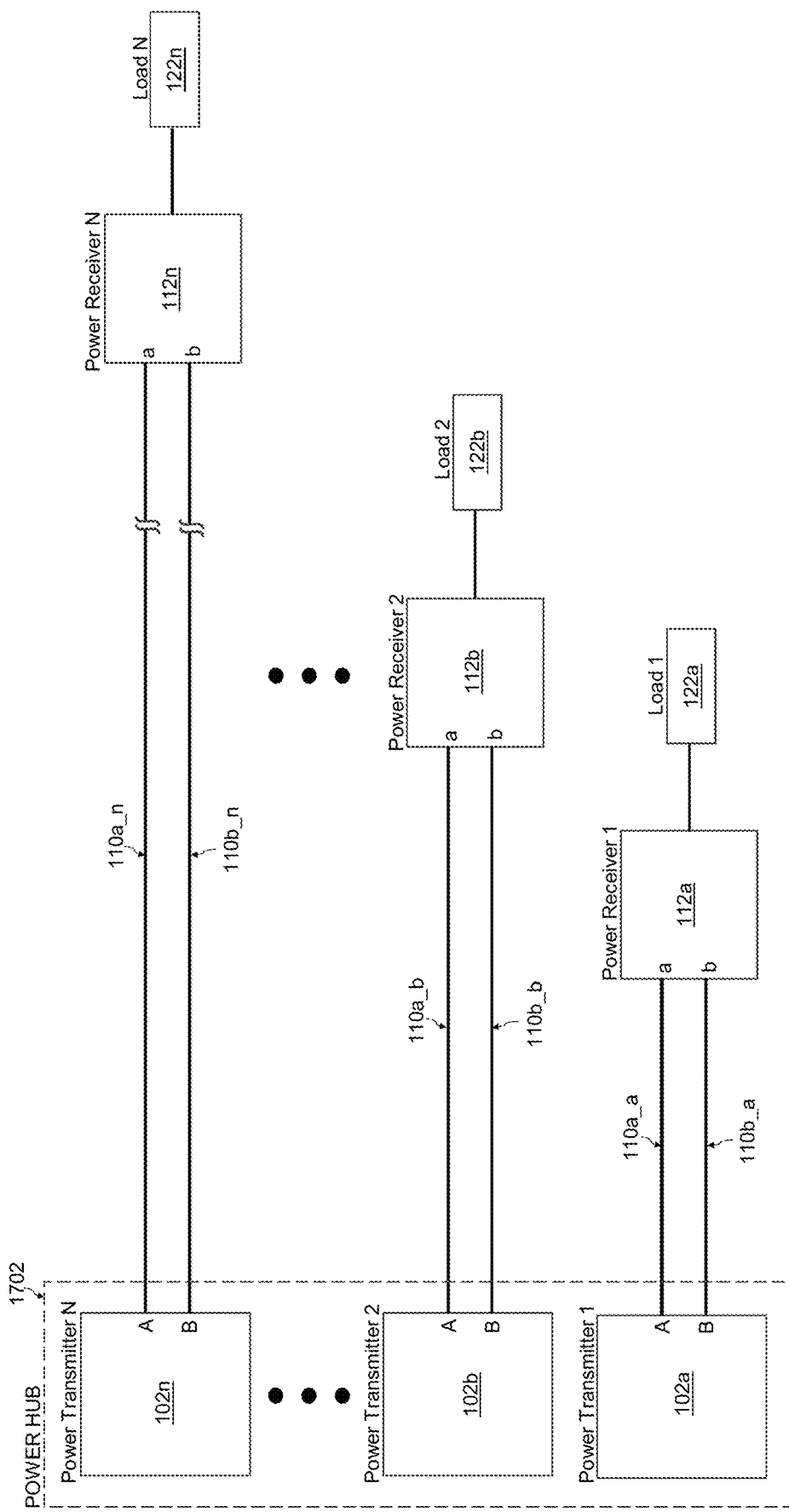
FIG. 15 is a block diagram illustrating a point-to-point powering architecture in which the system of FIGS. 1-3 and 5 may be used, according to an example embodiment.

Referring now to FIG. 15, there is depicted a block diagram of a point-to-point powering architecture for which an example embodiment of the system 100 may be used. More particular, FIG. 15 depicts first through Nth power transmitters 102a-n, power receivers 112a-n, and loads 122a-n. First through Nth conductor pairs 110a_a-n and 110b_a-n respectively electrically couple the first through Nth power transmitters 102a-n to the power receivers 112a-n, and the first through Nth powered devices are respectively electrically coupled to the first through Nth loads 122a-n.

Figure 16:
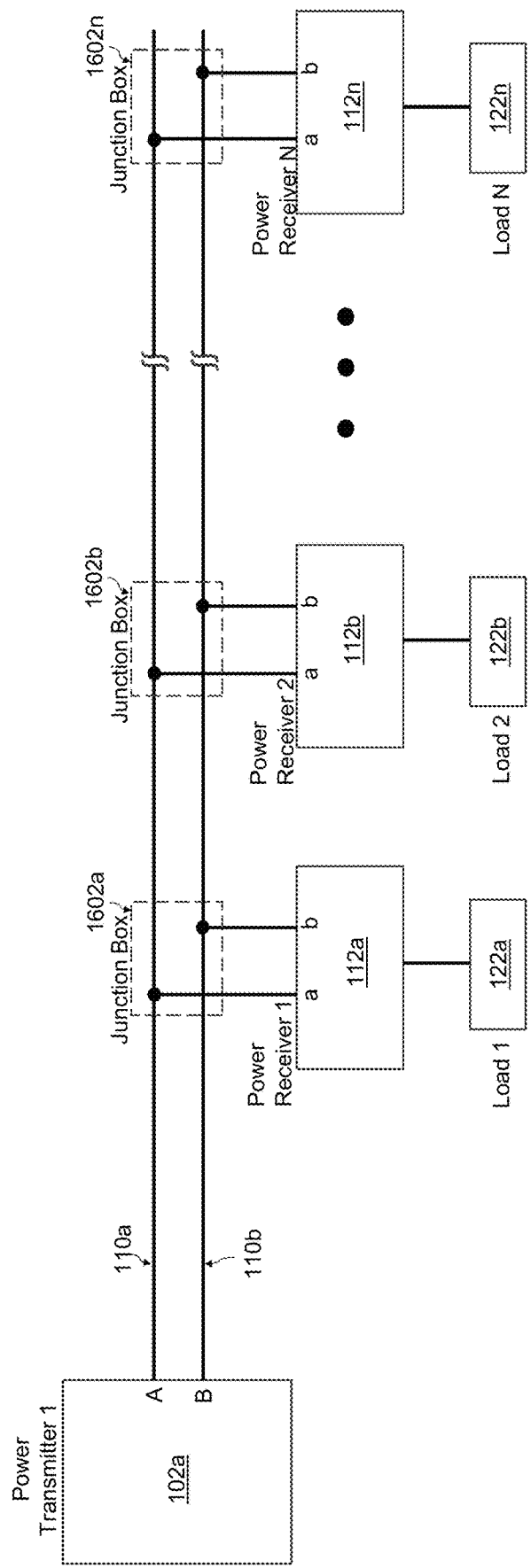
FIG. 16 is a block diagram illustrating a bus powering architecture in which the system of FIGS. 1-3 and 5 may be used, according to an example embodiment.

Referring now to FIG. 16, there is depicted a block diagram illustrating a bus powering architecture for which an example embodiment of the system 100 may be used. More particularly, the first power transmitter 102a power the first through Nth power receivers 112a-n via first through Nth junction boxes 1602a-n. The first through Nth power receiver 112a-n respectively power the first through Nth loads 122a-n.

Figure 17:
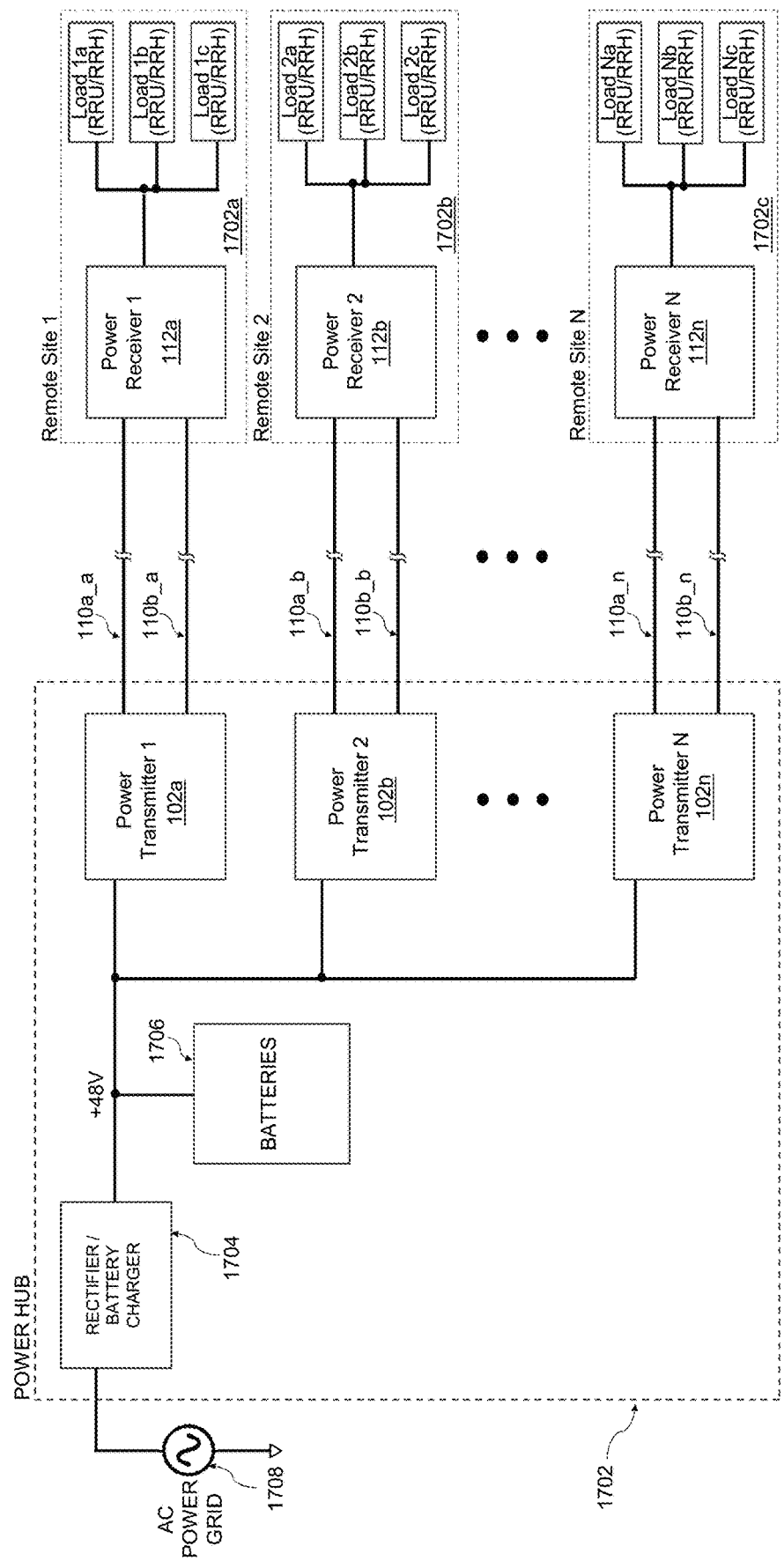
FIG. 17 is a block diagram illustrating a complete system of line powering for a telecom small cells application utilizing the point-to-point system architecture of FIG. 15, according to an example embodiment.

Referring now to FIG. 17, there is depicted a block diagram illustrating a complete system of line powering for a telecom small cells application utilizing the point-to-point system architecture of FIG. 15, according to an example embodiment. As in FIG. 15, first through Nth power transmitters 102a-n respectively power first through Nth power receivers 112a-n. The first through Nth power receivers 112a-n respectively power groups of loads: loads 1a-c are powered by the first power receivers 112a, loads 2a-2c are powered by the second power receivers 112b, and loads Na-Nc are powered by the Nth power receivers 112n. First through Nth conductor pairs 110a_a-n and 110b_a-n respectively electrically coupled the first through Nth power transmitters 102a-n to the first through Nth power receivers 112a-n.

The first through Nth power receivers 112a-n and their loads are respectively located at first through Nth remote sites 1702a-n, which are located remote from a power hub 1702 at which the first through Nth power transmitters 102a-n are located. The power transmitters 102a-n receive DC power from one or both of batteries 1706 and a rectifier/battery charger 1704 located at the power hub 1702. The rectifier/battery charger 1704 receives power from an AC power grid 1708.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

The controller 113 used in the foregoing embodiments may comprise, for example, a processing unit (such as a processor, microprocessor, or programmable logic controller) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A system comprising:
   (a) first and second power converters, wherein power outputs of the first and second power converters are electrically coupled together in parallel;
   (b) first and second supply-side current sensors for measuring first and second supply-side currents flowing into first and second conductor pairs, respectively, from the at least one power supply;
   (c) first and second remote-side current sensors for measuring first and second remote-side currents flowing into the first and second power converters from the first and second conductor pairs, respectively;
   (d) a current balancing controller for communicating with the first and second power converters and the first and second remote-side current sensors, and configured to balance the first and second remote-side currents flowing into the first and second power converters in response to measurements from the first and second remote-side current sensors;
   (e) at least one switch electrically coupled to the at least one power supply and operable to adjust magnitudes of the first and second supply-side currents; and
   (f) a fault management controller for communicating with the at least one switch and the first and second supply-side current sensors, wherein the fault management controller is configured to:
      (i) determine that a difference between the first and second supply-side currents at least meets a magnitude threshold; and
      (ii) reduce the first and second supply-side currents in response to the difference at least meeting the magnitude threshold until the difference is less than the magnitude threshold by using the at least one switch.

2. The system of claim 1, wherein the fault management controller is further configured to determine a duration for which the difference between the first and second supply-side currents at least meets the magnitude threshold, and wherein the first and second currents are reduced in response to the difference at least meeting the magnitude threshold and the duration at least meeting a duration threshold.

3. The system of claim 1, wherein the at least one power supply comprises a first power supply, and wherein the first and second conductor pairs are both powered by the first power supply.

4. The system of claim 1, wherein the first conductor pair comprises a first conductor and a common return line, and wherein the second conductor pair comprises a second conductor and the common return line.

5. The system of claim 1, wherein the at least one power supply comprises a first power supply and a second power supply, the first conductor pair is powered by the first power supply, and the second conductor pair is powered by the second power supply.

6. The system of claim 1, wherein each of the first and second power converters comprises a DC-DC converter comprising primary switches operable to control an input impedance or gain of the DC-DC converter, wherein the DC-DC converter is configured to receive a drive signal based on a control signal from the current balancing controller and to adjust a switching frequency or the duty cycle of the primary switches in response to the drive signal.

7. The system of claim 6, wherein each of the first and second power converters further comprises a feedback loop electrically coupled to an output of the DC-DC converter and configured to generate the drive signal based on a measurement of at least one of voltage and current at the power output of the power converter, and on the control signal.

8. The system of claim 6, wherein each of the first and second power converters further comprises a fixed frequency or duty cycle pulse generator and is configured to generate the drive signal based on an output of the fixed frequency or duty cycle pulse generator and on the control signal.

9. The system of claim 6, wherein the current balancing controller comprises:
   (a) a current averaging circuit electrically coupled to the first and second remote-side current sensors for determining an average remote-side current;
   (b) first and second current summing circuits each electrically coupled to the current averaging circuit and respectively electrically coupled to the first and second remote-side current sensors for respectively determining first and second remote-side current errors between each of the first and second remote-side currents and the average remote-side current; and
   (c) first and second compensation circuits respectively coupled to the first and second current summing circuits for generating the control signal that is sent to the first power converter and the control signal that is sent to the second power converter.

10. The system of claim 1, wherein the fault management controller comprises:
    (a) current summing circuitry electrically coupled to the first and second supply-side current sensors and configured to generate a current signal representing a difference between the first and second supply-side currents; and
    (b) current signal qualifying circuitry comprising a comparator configured to compare the current signal to the magnitude threshold and output a comparator output signal, wherein the fault management controller turns off the first and second supply-side currents based on the comparator output signal indicating that the current signal at least meets the magnitude threshold.

11. The system of claim 10, wherein the fault management controller is further configured to determine a duration for which the difference between the first and second supply-side currents at least meets the magnitude threshold, wherein the first and second supply-side currents are reduced in response to the difference at least meeting the magnitude threshold and the duration at least meeting a duration threshold, and wherein the fault management controller further comprises signal on-delay circuitry comprising an on-delay timer that is electrically coupled to the output of the comparator and that is configured to output a fault signal when the comparator output signal has indicated that the current signal at least meets the magnitude threshold for the duration threshold.

12. The system of claim 11, further comprising timer delay period circuitry electrically coupled to the current summing circuitry and configured to determine the duration threshold as a value that varies in response to the difference between the first and second supply-side currents.

13. The system of claim 12, wherein the timer delay period circuitry is configured to determine the duration threshold from a lookup table indexed by different values of the difference between the first and second supply-side currents, or formulaically based on the difference between the first and second supply-side currents.

14. The system of claim 1, wherein the at least one switch comprises part of the at least one power supply, and wherein the fault management controller is configured to modulate the at least one switch to reduce the first and second supply-side currents to non-zero values.

15. The system of claim 1, wherein the at least one switch is opened to reduce the first and second supply-side currents to zero.

16. A method comprising:
    (a) measuring first and second supply-side currents flowing from at least one power supply and into first and second conductor pairs, respectively;
    (b) measuring first and second remote-side currents flowing from the first and second conductor pairs and into first and second power converters, respectively, wherein power outputs of the first and second power converters are electrically coupled together in parallel;
    (c) balancing the first and second remote-side currents in response to measurements of the first and second remote-side currents;
    (d) determining that a difference between the first and second supply-side currents at least meets a magnitude threshold; and
    (e) reducing the first and second supply-side currents in response to the difference at least meeting the magnitude threshold until the difference is less than the magnitude threshold.

17. The method of claim 16, further comprising determining a duration for which the difference between the first and second supply-side currents at least meets the magnitude threshold, wherein the first and second supply-side currents are reduced in response to the difference at least meeting the magnitude threshold and the duration at least meeting a duration threshold.

18. The method of claim 16, wherein the at least one power supply comprises a first power supply, and wherein the first and second conductor pairs are both powered by the first power supply.

19. The method of claim 16, wherein the first conductor pair comprises a first conductor and a common return line, and wherein the second conductor pair comprises a second conductor and the common return line.

20. The method of claim 16, wherein the at least one power supply comprises a first power supply and a second power supply, the first conductor pair is powered by the first power supply, and the second conductor pair is powered by the second power supply.

21. The method of claim 16, wherein each of the first and second power converters comprises a DC-DC converter comprising primary switches operable to control an input impedance or gain of the DC-DC converter, and further comprising for each of the first and second power converters:

(a) receiving a control signal from a current balancing controller; and
(b) generating a drive signal based on the control signal, wherein actively balancing the first and second currents comprises adjusting a switching frequency or duty cycle of the primary switches in response to the drive signal.

22. The method of claim 21, further comprising, for each of the first and second power converters:
    (a) measuring at least one of voltage and current at a power output of the power converter; and
    (b) generating the drive signal based on a measurement of at least one of voltage and current at a power output of the power converter and on the control signal.

23. The method of claim 21, further comprising, for each of the first and second power converters, generating the drive signal based on an output of a fixed frequency or duty cycle pulse generator and on the control signal.

24. The method of claim 21, further comprising, at the current balancing controller:
    (a) determining an average remote-side current entering the first and second power converters from the first and second remote-side currents;
    (b) determining first and second remote-side current errors between each of the first and second remote-side currents and the average remote-side current; and
    (c) generating the control signal for the first power converter from the first remote-side current error and generating the control signal for the second power converter from the second remote-side current error.

25. The method of claim 17, further comprising:
    (a) determining a difference between the first and second supply-side currents; and
    (b) determining the duration threshold as a value that varies in response to the difference between the first and second supply-side currents.

26. The method of claim 25, wherein the duration threshold is determined from a lookup table indexed by different values of the difference between the first and second supply-side currents, or formulaically based on the difference between the first and second supply-side currents.

27. The method of claim 16, wherein reducing the first and second supply-side currents comprises modulating switches in the at least one power supply such that the first and second supply-side currents are reduced to non-zero values.

28. The method of claim 16, wherein reducing the first and second supply-side currents comprises opening at least one switch to reduce the first and second supply-side currents to zero.

29. A non-transitory computer readable medium having stored thereon computer program code that is executable by a processor and that, when executed by the processor, causes the processor to perform a method comprising:
    (a) measuring first and second supply-side currents flowing from at least one power supply and into first and second conductor pairs, respectively;
    (b) measuring first and second remote-side currents flowing from the first and second conductor pairs and into first and second power converters, respectively, wherein power outputs of the first and second power converters are electrically coupled together in parallel;
    (c) balancing the first and second remote-side currents in response to measurements of the first and second remote-side currents;

(d) determining that a difference between the first and second supply-side currents at least meets a magnitude threshold; and
(e) reducing the first and second supply-side currents in response to the difference at least meeting the magnitude threshold until the difference is less than the magnitude threshold.

* * * * *